(12) United States Patent
Noonan et al.

(10) Patent No.: US 11,039,268 B1
(45) Date of Patent: Jun. 15, 2021

(54) SYSTEM AND METHOD FOR DETECTING AND CONTROLLING TRANSMISSION DEVICES

(71) Applicants: Joseph S. Noonan, Scituate, MA (US); Carl A. Giordano, valley cottage, NY (US)

(72) Inventors: Joseph S. Noonan, Scituate, MA (US); Carl A. Giordano, valley cottage, NY (US)

(73) Assignee: BINJ Laboratories, Inc., Scituate, MA (US)

( * ) Notice: Subject to any disclaimer, the term of this patent is extended or adjusted under 35 U.S.C. 154(b) by 0 days.

(21) Appl. No.: 14/683,125

(22) Filed: Apr. 9, 2015

Related U.S. Application Data

(60) Division of application No. 12/868,725, filed on Aug. 26, 2010, now Pat. No. 9,066,194, which is a continuation-in-part of application No. 12/510,036, filed on Jul. 27, 2009, now Pat. No. 8,983,446, which is a continuation-in-part of application No. 11/457,786, filed on Jul. 14, 2006, now Pat. No. 8,078,190, application No. 14/683,125, which is a continuation-in-part of application No. 12/231,437, filed on Sep. 2, 2008, now Pat. No. 9,037,098, which is a continuation-in-part of application No. 12/157,530, filed on Jun. 11, 2008, now Pat. No. 8,238,936, which is a continuation-in-part of
(Continued)

(51) Int. Cl.
*H04M 3/00* (2006.01)
*H04W 4/021* (2018.01)
*H04W 8/24* (2009.01)
*H04M 1/72457* (2021.01)
*H04M 1/72463* (2021.01)

(52) U.S. Cl.
CPC ....... *H04W 4/021* (2013.01); *H04M 1/72457* (2021.01); *H04M 1/72463* (2021.01); *H04W 8/24* (2013.01)

(58) Field of Classification Search
CPC .................................................... H04W 4/021
See application file for complete search history.

(56) References Cited

U.S. PATENT DOCUMENTS

| | | | |
|---|---|---|---|
| 4,054,754 A | 10/1977 | Nicodemus | |
| 4,083,003 A | 4/1978 | Haemmig | |

(Continued)

*Primary Examiner* — Justin Y Lee
(74) *Attorney, Agent, or Firm* — Law Office of Carl Giordano, PC

(57) ABSTRACT

A method of detecting, controlling and managing transmission of a transmitting device within a facility is disclosed. the method involves transmitting information to the transmission device, detecting a response transmission from the transmission device by a least one transmission detection facility, extracting identification information associated with the transmission device in response to the transmitted information; and determining a location of the transmission device based on the response transmission received by the at least one received transmission detection facility, wherein the response transmissions are sorted by the identification information, determining an allowability of the located transmission device with the set area and interacting and manipulating transmission of the detected transmitting device.

29 Claims, 26 Drawing Sheets

Related U.S. Application Data application No. 11/457,786, filed on Jul. 14, 2006, now Pat. No. 8,078,190.

(60) Provisional application No. 60/699,281, filed on Jul. 14, 2005, provisional application No. 60/739,877, filed on Nov. 23, 2005, provisional application No. 61/237,682, filed on Aug. 28, 2009, provisional application No. 61/264,838, filed on Nov. 30, 2009.

(56) References Cited

U.S. PATENT DOCUMENTS

| | | | |
|---|---|---|---|
| 4,638,496 A | 1/1987 | Jensen | |
| 5,440,758 A | 8/1995 | Grube | |
| 5,613,205 A | 3/1997 | Dufour | |
| 5,966,655 A | 10/1999 | Hardouin | |
| 6,031,490 A | 2/2000 | Forssen | |
| 6,205,189 B1 | 3/2001 | Ha | |
| 6,222,458 B1 | 4/2001 | Harris | |
| 6,343,212 B1 | 1/2002 | Weber | |
| 6,490,455 B1 | 12/2002 | Park | |
| 6,580,372 B1 | 6/2003 | Harris | |
| 6,687,506 B1 | 2/2004 | Girod | |
| 6,765,492 B2 | 7/2004 | Harris | |
| 6,907,254 B1 | 6/2005 | Westfield | |
| 7,046,990 B2 | 5/2006 | Grego | |
| 7,110,774 B1 | 9/2006 | Davis | |
| 7,202,798 B2 | 4/2007 | Harris | |
| 7,533,188 B1 | 5/2009 | Greger | |
| 8,346,281 B2 * | 1/2013 | Noonan | H04W 48/04 340/5.61 |
| 2001/0036821 A1 * | 11/2001 | Gainsboro | H04M 3/2281 455/410 |
| 2002/0011119 A1 | 1/2002 | Bignell | |
| 2002/0080954 A1 | 6/2002 | Felder | |
| 2002/0087062 A1 | 7/2002 | Schmit | |
| 2002/0098850 A1 | 7/2002 | Akhteruzzaman | |
| 2003/0056043 A1 | 3/2003 | Kostadinov | |
| 2003/0206112 A1 | 11/2003 | Harris | |
| 2004/0009778 A1 | 1/2004 | Makuta | |
| 2004/0033805 A1 | 2/2004 | Verma | |
| 2004/0043774 A1 | 3/2004 | Lee | |
| 2004/0113755 A1 | 6/2004 | Ricci | |
| 2004/0198346 A1 | 10/2004 | Swensen | |
| 2004/0203857 A1 | 10/2004 | Wang | |
| 2004/0246139 A1 | 12/2004 | Harris | |
| 2005/0046608 A1 | 3/2005 | Schantz | |
| 2006/0014548 A1 * | 1/2006 | Bolin | H04W 64/00 455/456.1 |
| 2006/0132307 A1 | 2/2006 | Velhal | |
| 2006/0099968 A1 | 5/2006 | Harris | |
| 2006/0105758 A1 | 5/2006 | Maislos | |
| 2006/0111062 A1 | 5/2006 | Cunningham | |
| 2006/0160045 A1 | 7/2006 | Goren | |
| 2006/0160545 A1 | 7/2006 | Goren | |
| 2006/0192709 A1 | 8/2006 | Schantz | |
| 2007/0206542 A1 | 9/2007 | Proctor, Jr. | |
| 2008/0043689 A1 | 2/2008 | Walter | |
| 2009/0325566 A1 | 12/2009 | Bell | |
| 2010/0159877 A1 | 6/2010 | Salkini | |
| 2010/0159879 A1 | 6/2010 | Salkini | |
| 2010/0176918 A1 | 7/2010 | Turner | |

* cited by examiner

1700

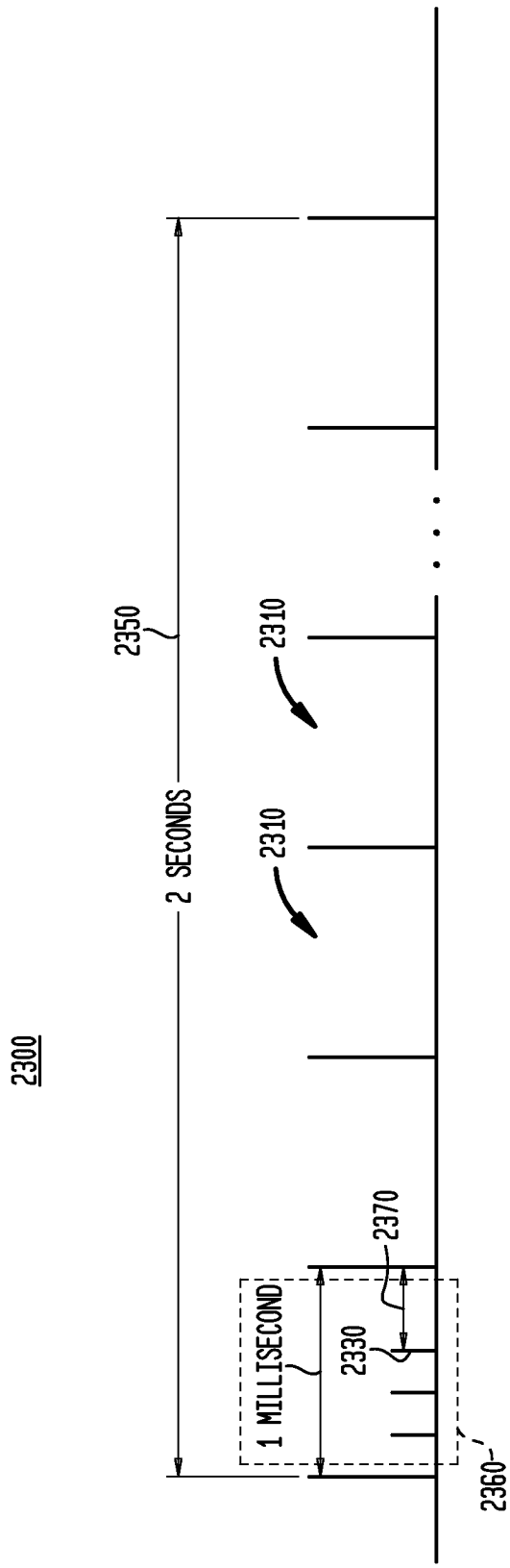

SYSTEM AND METHOD FOR DETECTING AND CONTROLLING TRANSMISSION DEVICES

CLAIM OF PRIORITY

This application claims the benefit of the earlier filing date, pursuant to 35 USC § 120, as a divisional application of that patent application entitled "system and method of detection of transmission devices," filed on Aug. 26, 2010 and afforded U.S. Pat. No. 12/868,725, which claimed the benefit of the earlier filing date, pursuant to 35 USC § 120, as a continuation-in-part to that patent application entitled "system and method of detection of transmission facilities," filed in the united states patent and trademark office on Jul. 27, 2009 and afforded ser. no. 12/510,036, which claimed the benefit of the earlier filing date, pursuant to 35 USC § 120, as a continuation-in-part to that patent application entitled "systems and methods of detection transmission facilities," filed in the united states patent and trademark office on Jul. 14, 2006 and afforded ser. no. 11/457,786, which claimed the benefit of the earlier filing date, pursuant to 35 USC § 119, of U.S. Provisional App. No. 60/699,281 filed on Jul. 14, 2005 and U.S. Provisional App. No. 60/739,877 filed on Nov. 23, 2005 and further claims the benefit of the earlier filing date, pursuant to 35 USC 119, to U.S. Provisional App. No. 61/237,682, entitled "method and system for determining a location and tracking of a wireless device," filed on Aug. 28, 2009 and to U.S. Provisional App. No. 61/264,838, entitled "system and method of detection and allowing access of transmission facilities, filed on Nov. 30, 2009. the entire contents of all of which are incorporated by reference, herein.

the application further claims the benefit of the earlier filing date, pursuant to 35 USC 120, as a continuation-in-part to that patent application entitled "wrist band transmitter," filed in the united states patent and trademark office on Sep. 2, 2008 and afforded ser. no. 12/231,437, which claimed the benefit of the earlier filing date, pursuant to 35 USC § 120, as a continuation-in-part to that patent application entitled "Tracking and Determining a Location of a Wireless Transmission," filed in the United States Patent and Trademark Office on Jun. 11, 2008 and afforded Ser. No. 12/157,530, which claimed the benefit of the earlier filing date, pursuant to 35 USC § 120, as a continuation-in-part to that patent application entitled "Systems and Methods of Detection Transmission Facilities," filed in the United States Patent and Trademark Office on Jul. 14, 2006 and afforded Ser. No. 11/457,786, the entire contents of all of which are incorporated by reference, herein.

RELATED APPLICATION

This application is related to co-pending patent application entitled "Systems and Methods of Detection of Transmission Facilities, filed on Jul. 27, 2009 and afforded Ser. No. 12/510,006, which claimed the benefit, pursuant to 35 USC 120, as a continuation of that patent application entitled "Systems and Methods of Detection Transmission Facilities," filed in the United States Patent and Trademark Office on Jul. 14, 2006 and afforded Ser. No. 11/457,786, the contents of which are incorporated by reference, herein.

BACKGROUND

This invention relates to the field of wireless transmission and more particularly to determining a location of a wireless transmission device and controlling its use and tracking its movements.

2. Background

There are many facilities, such as government buildings, and in particular correctional facilities, such as prisons, that do not permit cellular phone usage or wireless transmission devices on the premises or even possession of cellular phones within the premises. Finding and preventing usage of cell phones and other transmission facilities is difficult, and a need exists for improved methods of detecting, locating, and managing the transmission of such devices.

SUMMARY OF THE INVENTION

Provided herein are methods and systems for locating transmission devices (or transmission facilities) such as cellular phones, cell phones, mobile phones, satellite phones, radios, transmitters, PDAs, beepers, pagers, walkie-talkies, email devices, instant messenger devices, voice over IP devices, and other types of wireless communication or transmission facilities whose possession is prohibited. In addition, control of the devices is important as such wireless devices are known to be used to detonate bombs, as in the case of improvised explosive devices. The methods herein are also to positively identify, locate and track individuals with such transmission facilities. For example, the system provides the location and tracking of one or more individuals who utilize a wireless device to communicate and further determines whether the individual is authorized to transmit within the general area local to the individual. In one aspect, law enforcement may be interested in tracking the individual's identification and movements.

Methods relate to locating and managing the use and presence of wireless communication facilities are further disclosed. Embodiments relate to detecting wireless devices when they transmit a signal are further disclosed. Other embodiments relate to detecting of transmission devices when the transmission devices (i.e., facilities) are in a non-active transmission active state.

In embodiments the methods and systems disclosed herein include methods and systems for detecting a transmitting device within an obstruction rich environment. The methods and systems may include detecting the transmitting device within a wireless detection transmission facility; communicating signal information relating to the detected transmitting device from the wireless transmission detection facility to a central unit; determining the location of the transmitting device; displaying information of the detection and location of the transmitting device through a user interface; and providing the information to an action facility for causing actions related to the detected transmitting device. In embodiments, the wireless transmission detection facility is an antenna. In embodiments, the antenna is a dual dipole embedded antenna. In embodiments, the dual dipole embedded antenna is tuned to receive cell phone transmissions. In embodiments the dual dipole embedded antenna is tuned to receive a frequency band of approximately 700 to 950 MHz. In embodiments the dual dipole embedded antenna is tuned to receive a frequency band of approximately 1.7 to 2.0 GHz. In embodiments the dual dipole antenna is tuned to receive signals in frequency bands of approximately 700 to 950 MHz and 1.7 to 2.0 GHz. In embodiments the obstruction rich environment is a correctional facility. In embodiments the obstruction rich environment is a mall. In embodiments, communicating the information relating to the detected transmitting device from the wireless transmission detection facility to a central unit involves wireless communications. In embodiments, the wireless communications are 802.11 communications. In embodiments, determining the location of the transmitting device is accomplished through transmission triangulation. In embodiments location of the transmitting device is accomplished through a known location of a single antenna. In embodiments the location of the transmitting device is determined based on extrapolation of the receipt of a plurality of received signals through a series of non-iterative linear equations.

BRIEF DESCRIPTION OF FIGURES

The systems and methods described herein may be understood by reference to the following figures:

FIGS. 22 and 23 illustrates exemplary clock signals in accordance with the principles of the invention.

DETAILED DESCRIPTION OF THE INVENTION

Figure 1:
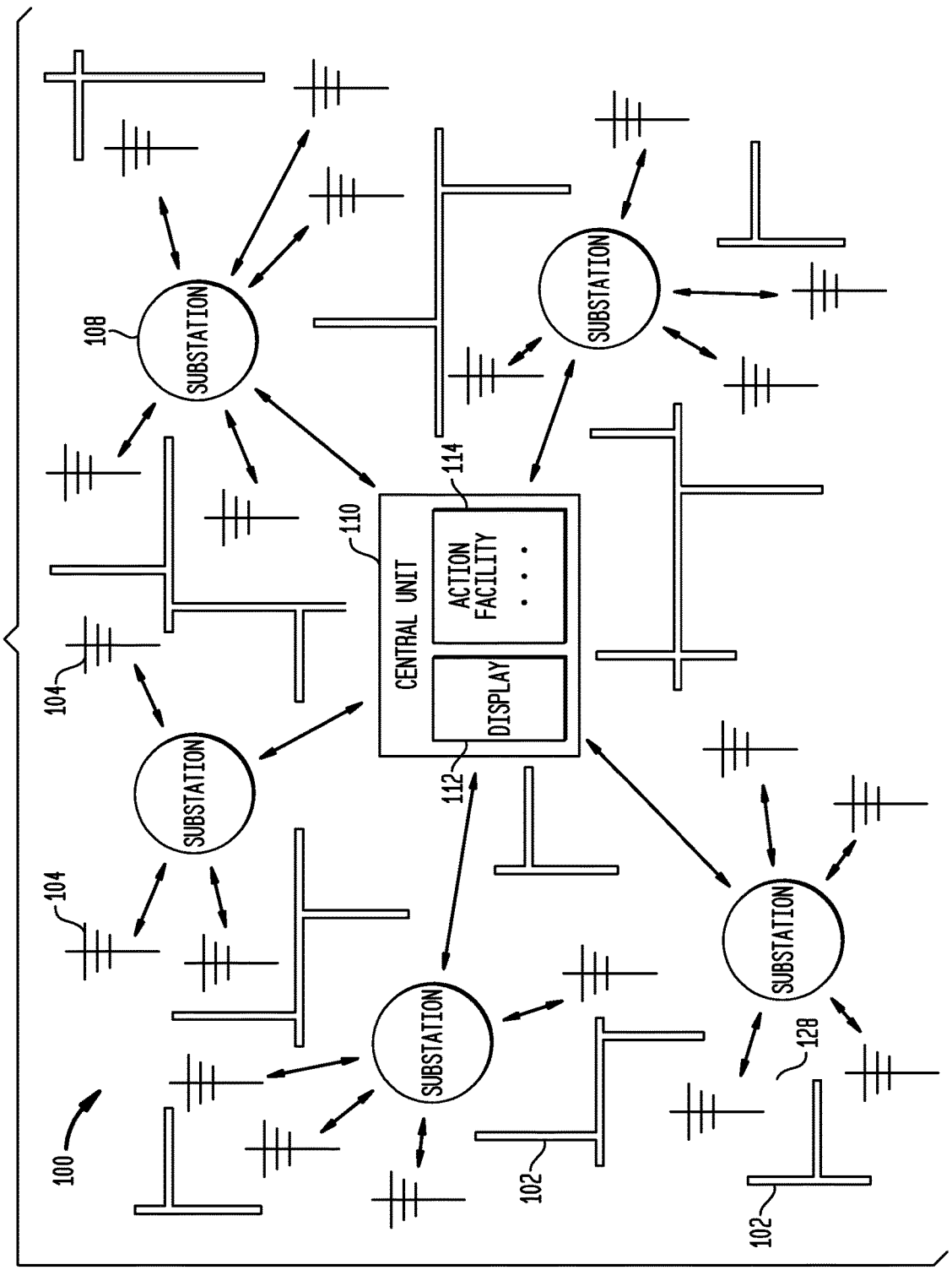
FIG. 1 shows a transmission detection, identification, and reporting system.
Figure 2:
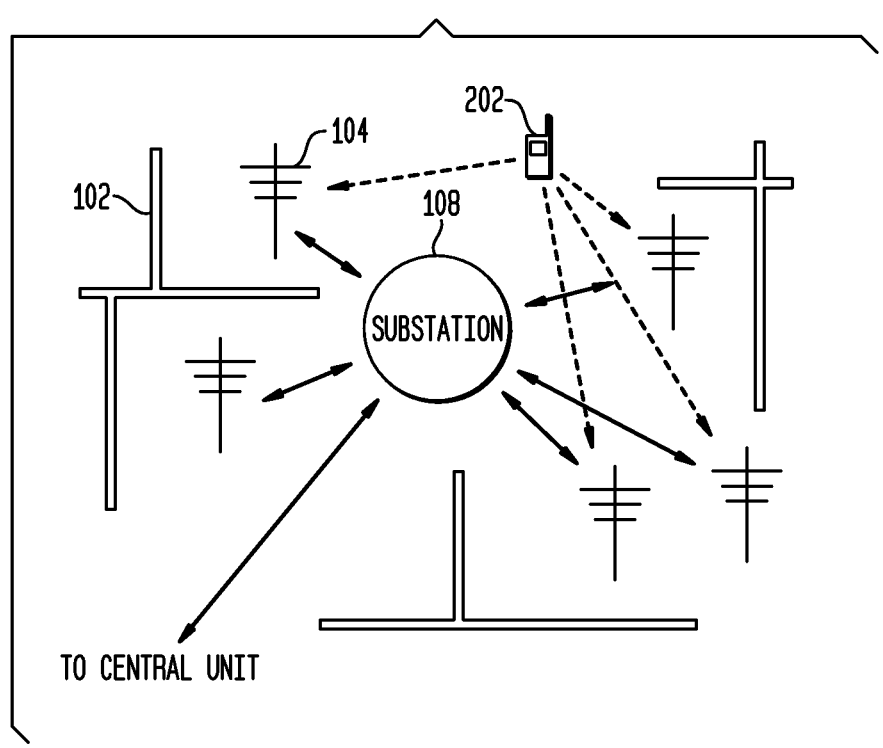
FIG. 2 illustrates a system for detecting a transmission facility

Detection of a transmission facility, such as a mobile phone or hand-held radio transmitter, or other transmission facility as described herein, within an obstruction rich environment, such as a facility with many physical barriers to electronic transmission, is difficult to achieve. Referring to FIG. 1, the transmission detection, identification, and reporting system 100 described herein provides a method of detecting a transmission facility 202, such as depicted in FIG. 2, within an environment rich in obstructions 102. One embodiment of the transmission detection, identification, and reporting system 100 may involve the detection of a mobile phone within a heavily walled and metal-barred government facility such as a correctional facility. In this embodiment, the system may utilize an array of antennas 104 selectively placed within the facility, collection substations 108 for localized collection of detected signals, a central unit 110 for the processing of incoming signals from the facility, a display 112 for showing the location of the detected transmission facility 202, and an action facility 114 for implementing standard procedures in the event of a detection. In this embodiment, the communications between the antennas 104 and the substations 108, and between the substations 108 and the central unit 110, may be wireless to make installation and maintenance of the system within the facility, cost and time effective. Selective placement of the antennas 104, combined with algorithms and methods for determining location of the transmission facility 202, may allow a substantially improved means for locating transmission facilities 202, such as mobile phones, in an otherwise heavily shielded environment.

Figure 3:
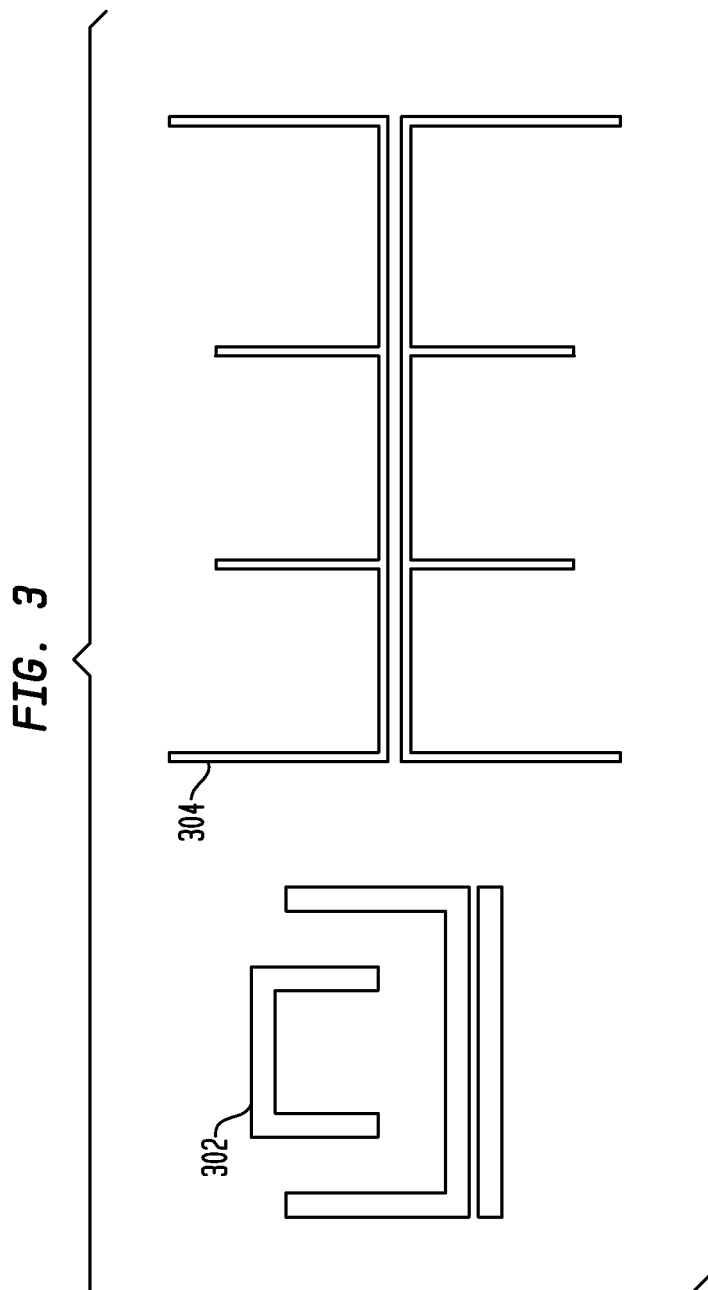
FIG. 3 illustrates exemplary antenna configurations.

In embodiments the antenna 104 may be a multi-dipole embedded antenna. Two examples of dual dipole embedded antennas are provided in FIG. 3 as a first dual-dipole embedded antenna 302 and a second dual dipole embedded antenna 304. In embodiments the antenna may be adapted to receive one, two, three, four, or more bandwidths. In embodiments the antenna 104 may be selected as one or more of a dipole antenna 104, a Yagi-Uda antenna 104, a loop antenna 104, a quad antenna 104, a micro-strip antenna 104, a quad antenna 104, a helical antenna 104, a phase array antenna 104, a patch antenna or a combination thereof.

In embodiments, the transmission facility 202 may be a mobile phone, such as a flip phone, a slide phone, a cellular phone, a handset, a satellite phone, a 3G phone, a wireless phone, a cordless phone or the like. In embodiments, the transmission facility 202 may be a radio, such as a Walkie-Talkie, a mobile radio, a short-wave radio, or the like.

In embodiments, the transmission band from the transmission facility 202 may be within the radio or other electromagnetic frequency spectrum, such as extremely low frequency (ELF), super low frequency (SLF), ultra low frequency (ULF), very low frequency (VLF), low frequency (LF), medium frequency (MF), high frequency (HF), very high frequency (VHF), ultra high frequency (UHF), super high frequency (SHF), extremely high frequency (EHF), microwave, a frequency suitable for 802.11x wireless communications, ultra wide band (UWB), Bluetooth, or the like.

In embodiments, the obstruction rich environment 102 may be a building, such as a corrections facility, a school, a government facility, a store, a mall, a residence, a hotel, a motel, or the like. In embodiments, the obstruction rich environments 102 may be a large confined space, such as a courtyard, a food court, a recess area, a hallway, greenhouse, recreation room, gymnasium, auditorium, kitchen, cafeteria, craft area, work area, library, prison yard, or the like. In embodiments, the transmission obstruction 102 materials such as cinderblock, cement, rebar, wire cage, metal, metal coated surface, or the like. In embodiments, the obstructions in the obstruction rich environments 102 may be other construction materials, such as wood, glass, rug, flooring materials, roofing materials, and the like.

In embodiments, the transmitting signal information from the antenna 104 module to the central unit 110 may be through a communications connection, such as an IEEE 802.15.4 wireless network, IEEE 802.11 Wi-Fi, Bluetooth, Ethernet, and/or other similar type wireless communication protocols. In embodiments, the communications connection may utilize CAT-5, RJ-45, RS-232 connections, and/or other similar type wired communication protocols and hardware. In embodiments the communications connection may utilize an optical connection, such as a wireless infrared link, wireless visible light, an optical fiber, and the like.

In embodiments, the transmitting signal information from the antenna 104 module to the central unit 110 may contain data, such as CDMA, CDPD, GSM, TDMA, and the like, and may be used to discriminate which service signal is being used, such as Verizon, Cingular, T-Mobile, Sprint, and the like. The detection of the cell phones may be further resolved down to cell phone manufacturer and cell phone provider.

In embodiments, the transmitting signal information to the central unit 110 may be made through an intermediate connection, such as a substation 108, router, switch, hub, bridge, multiplexer, modem, network card, network interface, processing unit, preprocessor, computer, repeater, antenna 104, and the like. (see FIG. 2).

In embodiments, the central unit 110 may have in part a computer, a computer system, a network of computers, a state machine, a sequencer, a microprocessor, a digital signal processor, an audio processor, a preprocessor, a microprocessor, and the like.

In embodiments, the central unit 110 may process information, such as location information, such as the location of people, inmates, corrections personnel, visitors, all personnel within the facility, equipment, resources, weapons, products, incoming goods, outgoing goods, and the like. In embodiments, the information may be a type of signal, such as mobile phone standard protocols such as CDMA, CDPA, GSM, TDMA, and the like. In embodiments, the information may be an event notification, such as personnel under duress, an emergency medical condition, a call for assistance, a fire, a call for police, a theft, and the like. In embodiments, the processed information may allow for the tracking of the person or object in possession of the transmission facility 202, such as a mobile phone, a radio, a weapon, a product, a resource, and the like. In embodiments, the processed information may allow for the discrimination and/or association between people or objects, such as determining the ownership of the transmission facility 202, the assignment of the source of transmission, current location of a transmission facility 202 compared to its predicted location, and the like. In embodiments, the processed information may also have time codes and unique identifiers assigned.

In embodiments, the central unit 110 may have a display 112, such as a cathode ray tube (CRT), liquid crystal display (LCD), electronic paper, 3D display, head-mounted display, projector, segmented display, computer display, graphic output display, and the like. In embodiments, the central unit 110 may have an action facility 114, comprising a user interface for causing actions relating to the detected transmission facility 202. Actions may for example represent operations such as closing a door, sealing a room, deploying an action signal, initiating an alarm, and the like.

In embodiments, the functions of a central unit 110 as described herein may be replaced by an alternate configuration, such as a configuration of multiple computers, such as a group of servers, processors, or the like, operating in parallel. In embodiments, the methods and systems described herein may involve locating computing capabilities in alternative network configurations, such as in a mesh network or a peer-to-peer network.

In embodiments, the location of a transmission facility 202 may be determined by various radiolocation or signal measurement techniques, including measuring phase, amplitude, time, or a combination of these; or by identifying and locating an area associated with an antenna 104 with the highest signal strength. In embodiments, the location of a transmission facility 202 may be determined when the transmission facility 202 is powered off though detection of a null in the band pass of a transmitted frequency sweep due to the presence of a mobile phone antenna.

In embodiments, a method of detecting a transmission facility 202 (e.g. cell phone) when the transmission facility 202 is not powered may require a transmitting device and a receiving device that can recognize the signature of an antenna 104 associated with the transmission facility 202. By transmitting a known frequency and receiving the disturbance pattern produced by having a particular antenna 104 design in the transmission path, the pattern or 'signature' of that antenna 104 can be characterized. In embodiments, this characterization may be evaluated by central unit 110 with results output to a display 112. A database of these signatures can be placed into the unit, and as the transmitter sweeps across the various cell frequencies, a pattern received can be matched against the database patterns to determine the presence of transmission facilities 202. In embodiments, any class of antenna (e.g. WI-FI, Blackberry, Walkie-Talkie, etc.) can be classified and identified.

In embodiments, the range of a hand held device that can detect an inactive transmission facility is approximately 10 feet. In embodiments, greater distances could be attained for stationary units by increasing the power.

Radiolocation, also referred to as radio-determination, as used herein, encompasses any process of finding the location of a transmitter by means of the propagation properties of waves. The angle, at which a signal is received, as well as the time it takes to propagate, may both contribute to the determination of the location of the transmission facility 202. There are a variety of methods that may be employed in the determination of the location of a transmission facility 202. Methods include (i) a cell-sector system that collects information pertaining to cell and sector ID's, (ii) the assisted-global positioning satellite (GPS) technology utilizing a GPS chipset in a mobile communication facility, (iii) standard GPS technology, (iv) enhanced-observed time difference technology utilizing software residing on a server that uses signal transmission of time differences received by geographically dispersed radio receivers to pinpoint a user's location, (v) time difference of arrival, (vi) time of arrival, (vii) angle of arrival, (viii) triangulation of cellular signals, (iix) location based on proximity to known locations (including locations of other radio-transmitters), (ix) map-based location, or any combination of any of the foregoing, as well as other location facilities known to those of skill in the art.

Obstructions to radio wave propagation in the obstruction rich environments 102 may greatly reduce the effectiveness of many of the conventional radiolocation methods due to obstruction of the line-of-sight between the transmission facilities 202 and the receiving antennas 104. However, by employing a large array of antennas 104, positioned so as to maintain line-of-sight between possible transmission facility 202 locations and the receiving antennas 104, several of these methods may be effectively used in the location of the transmission facility 202. These methods include time difference of arrival, time of arrival, and angle of arrival, amplitude comparison, and the like. The time difference of arrival method determines the difference in the time, or the difference in phase, of the same radio-transmitting signal arriving at different receiving antennas 104. Together with the known propagation speed of the radio wave, allows the determination of the location of the transmission facility 202. The time of arrival method determines the absolute time of reception of the signal at different receiving antennas 104, and again, along with the known propagation speed of the radio wave, allows the determination of the location of the transmission facility 202. The angle of arrival method utilizes direction of transmission to different antennas 104 to determine the location of the transmission facility. Amplitude comparison method compares the strength of the signal detected at each antenna to determine the location of a transmission facility 202. For example, two antennas 104 located in the same room would detect different signal amplitudes for the same transmission facility 202 output, thereby providing a means of determining which antenna 104 the transmission facility 202 is closer to. Increasing the number of antennas 104 therefore increases the resolution with which the location of the transmission facility 202 may be determined. All of these methods, and combinations of these methods, may employ mathematical processes such as triangulation, trilateration, multi-lateration, or like, in determining the location of the transmission facility.

Triangulation is the process of finding coordinates and distance to a point by calculating the length of one side of a triangle, given measurements of angles and/or sides of the triangle formed by that point, such as the target transmission facility 202, and two other known reference points, such as the receiving antennas 104. The calculation of the location of the transmission facility 202 may then be performed utilizing the law of Sines from trigonometry. Tri-lateration is a method similar to triangulation, but unlike triangulation, which uses angle measurements, together with at least one known distance, to calculate the subject's location, tri-lateration uses the known locations of two or more reference points and the measured distance to the subject, such as the transmission facility 202, and each reference point, such as the receiving antennas 104. Multi-lateration, or hyperbolic positioning, is similar to tri-lateration, but multi-lateration uses measurements of time difference of arrival, rather than time of arrival, to estimate location using the intersection of hyperboloids.

While several radiolocation and triangulation techniques have been described in connection with locating the transmitting device, it should be understood that one skilled in the art would appreciate that there are other location methodologies and such location methodologies are encompassed by the present invention. For example, in embodiments, the location of a single antenna may be known and the single antenna may detect a transmitting device. The location of the transmitting device may be estimated through its known proximity to the single antenna location. This may provide adequate location resolution for certain applications of the technology. Similarly, two or more antennas may be used and each of the antenna locations may be known. When each of the antennas receives a transmission, the corresponding signal strengths may be compared. The one with the highest signal strength may be determined as the one closest to the transmitting device so the corresponding antenna location may provide enough location resolution for certain applications.

In an embodiment of the transmission detection, identification, and reporting system 100, a corrections facility, with its substantial and inherent obstruction rich environment 102, presents a significant challenge to authorities of the correction facilities. In the embodiment if the invention shown and described herein, the system may be placed throughout the corrections facility for the purpose of alerting the corrections staff that cell phone activity is taking place, the location of the activity and the type, i.e., Nextel, T-Mobile, Verizon, and the like. The following technology may also allow for a standalone detection unit 408 or set of detection units 408 (see FIG. 4) to detect cell phones in schools, buildings and other environments in which the facility's or area's provider does not wish the use of cell phones and is interested in the detection of cell phone use.

In an embodiment, the system may include an integrated antenna 104 and RF detector (together referred to as a detector unit 408) (FIG. 4), a substation 108, (FIG. 1) whose purpose may be to communicate with each detector unit 408 within its sector, and report activity to the central unit 110 which reports confirmed activity, type of cell phone, and location to the display 112 of the central unit 110. These detection units 408 may be used individually or in conjunction with each other and may triangulate detection within a specific area. The outside yard areas may be monitored by detection units 408, which may cover large areas, such as 25×25 foot sectors or smaller areas, e.g., 5×5 foot sectors, to localize the detection of a cell phone (i.e., wireless transmission facility) and track its position from one sector to any adjoining sector. That is, as the person moves with a phone, the changing position of that phone may be reported. If the phone moves inside the facility, tracking may continue as interior detection units 408 detect the phone.

In an embodiment, within these basic groups of detection units 408 may be various detection unit 408 types. Some detection units 408 may be designed to be hard wired via RJ-45 connectors and/or CAT 5 cable, other detection units 408 may use 802.11b (WI-FI) wireless communications between detection units 408, and there may also be an Infra Red (IR) set of detection units 408 which utilize optical communications techniques. Each communications type may have a specific purpose within the corrections facility or other type of building and/or areas. Hard-wired units may be used when it is not possible to use either an optical unit or a WI-FI unit. Or used when there are walls embedded with metal or where the distance and the obstructions 102 may preclude a wireless technique. WI-FI detection units 408 may be used when it is effective to communicate in an area where there are obstructions 102 such as cement walls or cement with embedded rebar walls, facades, and the like. Optical detection units 408 may be used in areas where clear, line-of-sight communications may be possible. Optical detection units 408 may operate over relatively long distances, (e.g., 3,000 feet), while WI-FI detection units 408 may be limited to shorter distances, such as 250 feet.

In an embodiment, there may also be a hand-held detection units 408 to be used once a cell phone has been detected, and the corrections officer(s) or monitors are attempting to pinpoint the location. This hand-held detection unit 408 may be similar to the integrated antenna/detector unit of the main system. This embodiment may also include a detector, discriminator and decoder module. The hand-held detection units 408 may detect and identify each cell phone and compare the cell phone identity to the allowed cell phone user list or in this case to a list of unauthorized cell phones. This detector unit 408 may output an audible alarm whose pitch changes as the signal becomes stronger or weaker.

In an embodiment, a second type of hand-held detector unit 408 may be used to detect a cell phone when it is either off or in a standby condition, also referred to as null detecting. Null detection may be used at an ingress or egress of a building or an area as a way of detecting a communication device or device with an antenna. This technique may be used in areas where it is unpractical, unwanted or unwarranted to have x-ray machines or more intrusive detection systems. A null detection system may also be deployed in a handheld device so an inspector can move through an area attempting to detect a communication device. In embodiments, the null detection system may detect the presence of a transmission facility even when the transmission facility is not transmitting a signal. In embodiments, a hand held or mounted null detection device may be used in a correctional institution or other government facility.

In embodiments, null detection may utilize a transmission-detection source, independent of the transmission source being detected, which is capable of sweeping across the frequency spectrum of interest and receiving it's returning signal. The transmission source sweeps the spectrum of interest, searching for distortions in the returned field. Distortions in the spectrum may be due to the presence of an antenna of a transmission facility 202. Matching the distortion, also referred to as a null in the band pass, to characteristics of known antennas used with mobile phones may allow the detection and/or identification of the transmission facility 202. The unit may output an audible "beep" if it detects a null, allowing the officers to focus in on the location of the cell phone. The range of the hand-held detection units 408 may be, for example, 15 to 20 feet. This will allow cell phones that are in the immediate vicinity to be quickly detected. The null detection may be applicable for ingress and/or egress detection.

In an embodiment, a survey may be performed to determine optimal placement and the type and number of detection units 408 required. This will insure the minimum number of required detection units 408 to perform optimal detection. The team may provide a report detailing the layout determined to be optimized for the facility and may review this report with the facilities staff so that any required modifications to the plan may be incorporated before installation is begun.

In an embodiment, the initial coverage of a facility may be in the cell blocks 402 (FIG. 4) and/or pod areas. The same may be true for linear facilities. The survey may cover the entire facility, including open areas, such as courtyards, where required. Inmate also work in large yard and plantations such as Angola State Prison, it is anticipated this technology may be deployed over a large outside area.

Figure 4:
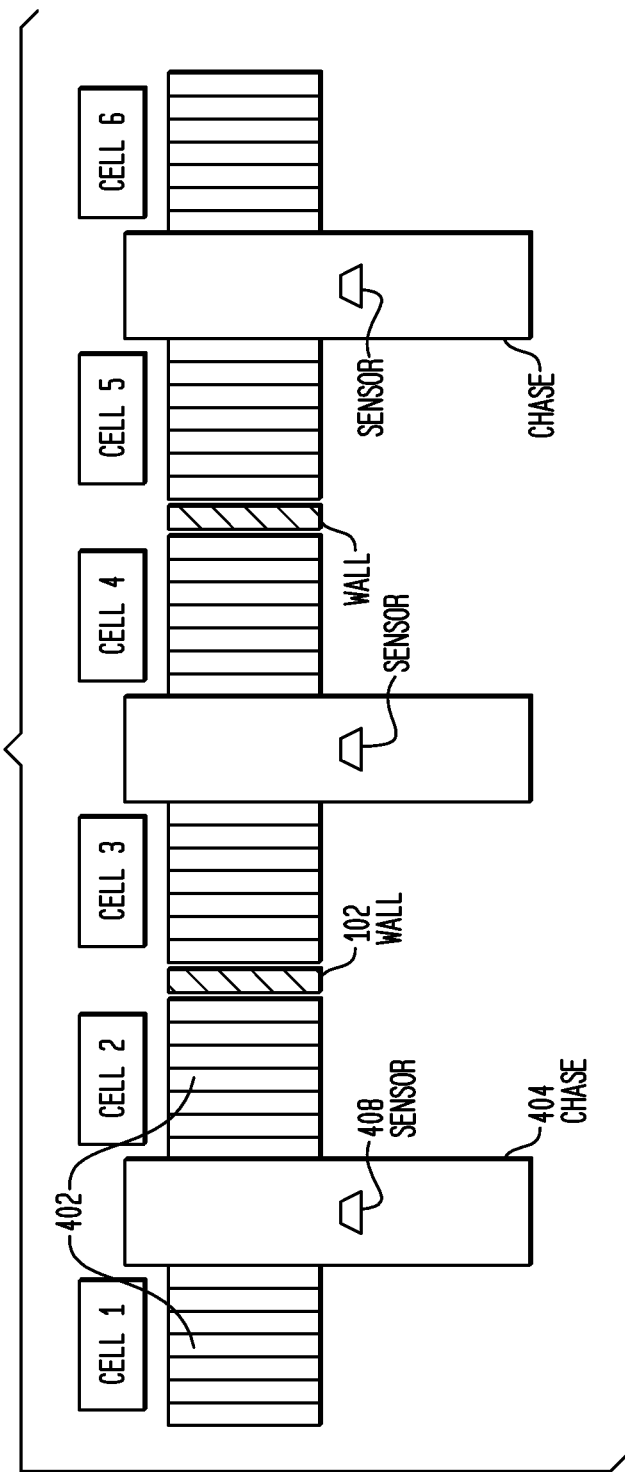
FIG. 4 illustrates a first system configuration for detecting a transmission facility in a cell environment.
Figure 5:
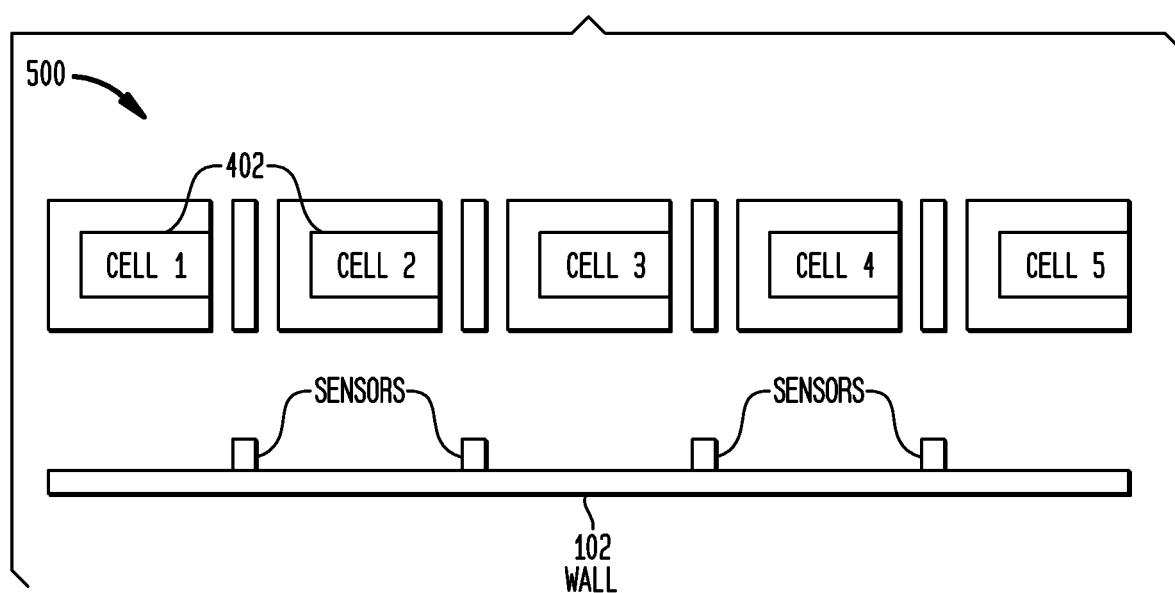
FIG. 5 shows a second system configuration for detecting a transmission facility in a cell environment.

In an embodiment, the cell block detection units 408 may be mounted inside each chase 404 (a column positioned between cells in a cell block that includes various utility facilities, such as for plumbing and electricity), as shown in FIG. 4, and may communicate to a substation 108 (not shown in FIG. 4) located at one end of the block. This detection unit 408 may communicate its information to the central unit 110 so that tracking, confirmation, and display may be accomplished. For linear facilities 500, as shown in FIG. 5, detector units 408 may be mounted along the walls in the obstruction rich environment 102 opposite the cells 402 and perform their function similar to the detection units 408 mounted within a chase 404.

Figure 6:
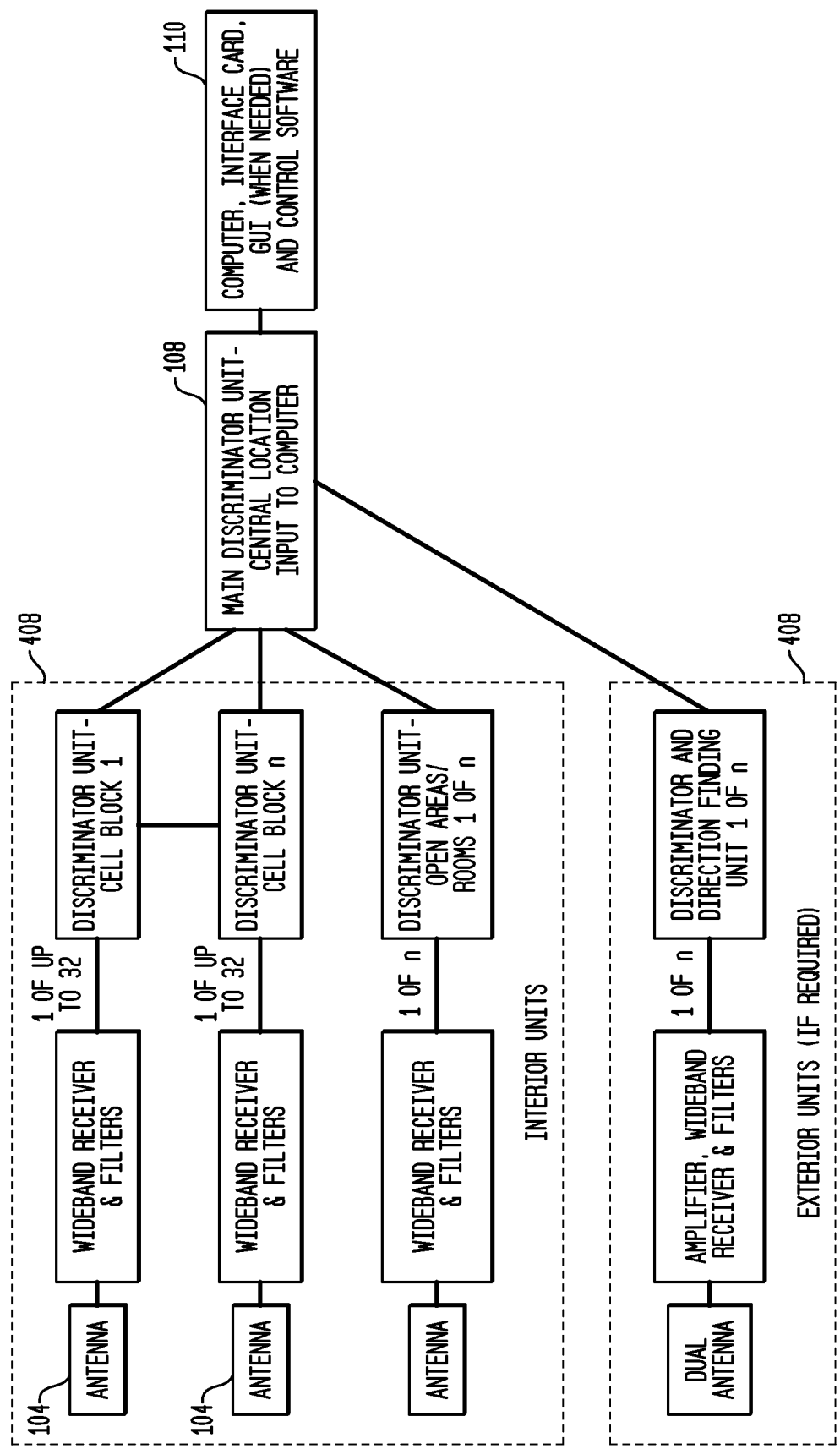
FIG. 6 illustrates a block diagram relating to actions taken when detecting transmission facilities.

In an embodiment, detector units 408 may be installed in open areas such as gymnasiums, kitchens, cafeterias, craft and work areas and other open areas where a cell phone may be used. The difference in these locations from the cell blocks 402 may include the method of detection and tracking. Since most facilities may only require the identification of a cell phones presence within a room, and there could be many inmates within that room, the process may be to lock-down the room, or rooms, in that area and use a hand held device and a physical search to pinpoint the phone location. A generalized block diagram of a detector unit 408 is shown in FIG. 6. For those facilities that require resolving the location within a large interior room or area, the use of triangulation to resolve to a 10×10 foot area may be used.

Figure 7:
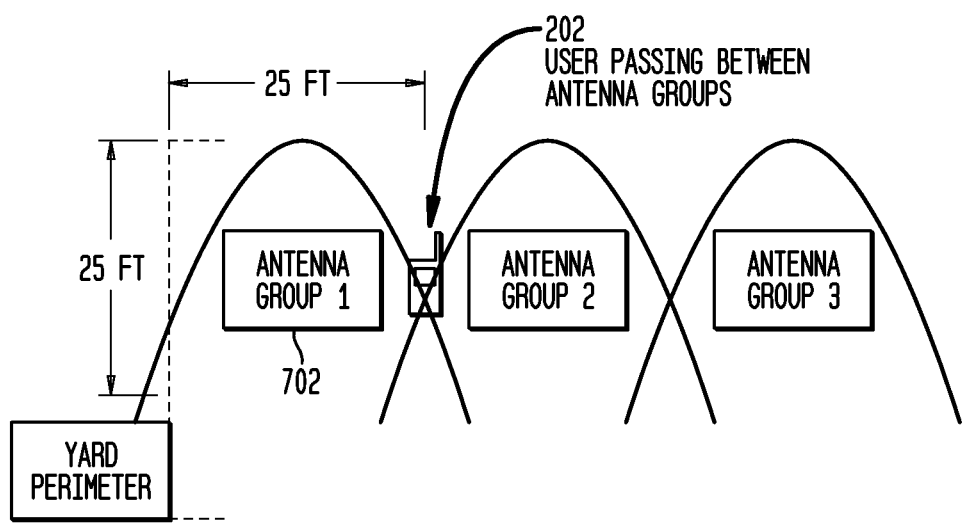
FIG. 7 shows a transmission facility detection system wherein an antenna array is used to determine location.

In an embodiment, facilities with the requirement to detect cell phones 202 in outside yard areas, the use of triangulation to a 25×25 foot space or smaller foot space (e.g., 5×5 foot) may be constructed. As a phone 202 is moved from area coverage 702 to area coverage 702, the system may track its movement. Each square foot sector may overlap an adjoining sector. In this way, as shown in FIG. 7, tracking may be continuous, without any gaps.

Figure 8:
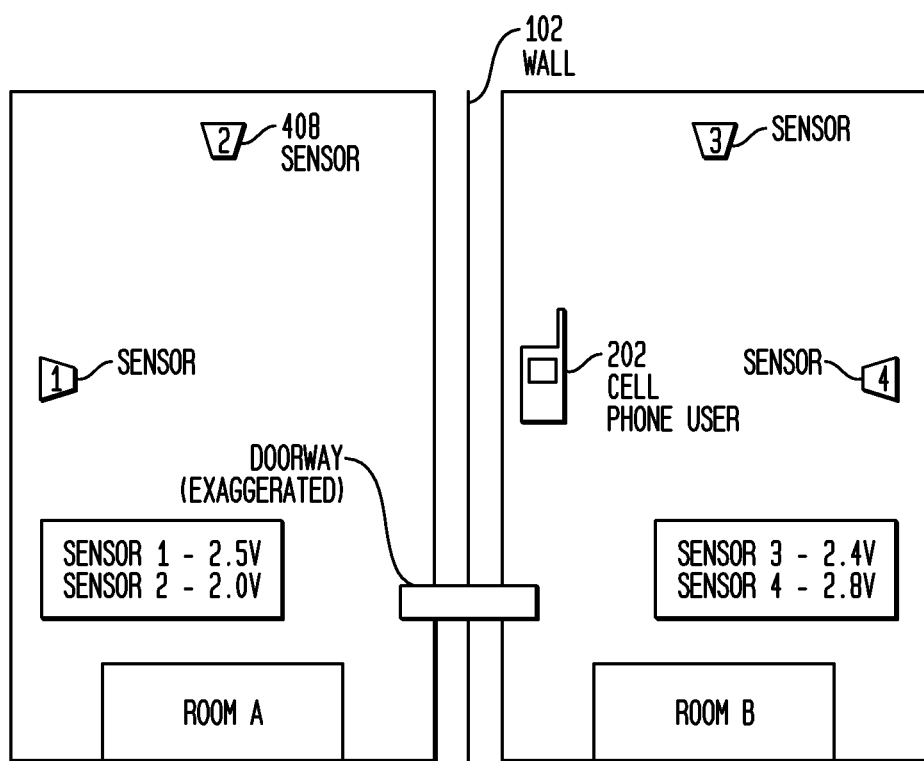
FIG. 8 shows a transmission facility detection system wherein a signal source is differentiated between two adjacent rooms.

In an embodiment, it may also be important to know whether a phone is located on one side of an obstruction or the other, such as doors, walls, and the like. If the wrong room is identified, it may make it more difficult to locate a phone and its user. As shown in FIG. 8, detection of the correct room may depend upon the level of the signal received. Proper placement of the detector units 408 may insure that the phone may be identified in the correct location.

Figure 9:
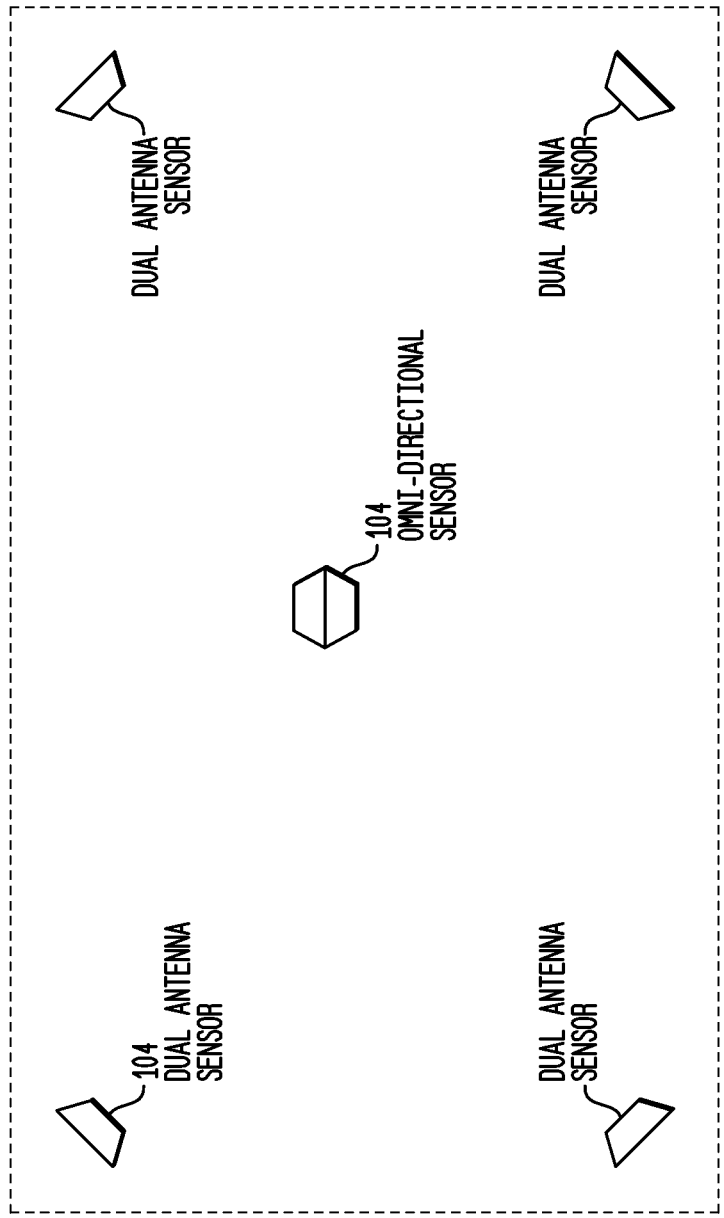
FIG. 9 illustrates a transmission facility detection system configuration employing multiple antennas are used to identify a location of a signal source after an omni-directional antenna has detected its presence.

In an embodiment, when sectoring a large room such as a gymnasium, the number and placement of antennas 104 may be critical. In order to sector large regions, such as a 10×10 foot section, within the room, the antenna 104 may need to be capable of narrowing their window to an area small enough to meet the requirement. In FIG. 9, there is shown an omni-directional antenna 104, which detects signal presence generally in a 360 degree direction. Once a signal crosses a threshold, the direction finding antennas 104 may be turned on to determine the position of the signal. This may be reported to the display 112 and tracked until it is either turned off or moves to another room or hallway. Then, normal positional tracking may take place.

In an embodiment, the transmission detection, identification, and reporting system 100 may work in conjunction with a personal alarm system, or an inmate tracking system, or a combination of all three and the like. This dual/tri role system(s) may allow for more cost effective use of the detection units 408 and provide for greater protection for the correctional officer and inmate alike. This detection system may utilize an individualized frequency, with known frequency separation between detection units 408 and between corrections officer's frequencies and Inmate frequencies.

The detection configuration of the detection units 408 may provide complete coverage of the facility. Each transmission facility unit may be continually tracked throughout the facility. At all ingress or egress points the focus of the detection may ensure accurate location of all correctional and inmate personnel. With the combined systems more detection units 408 may be needed to ensure full coverage. In an embodiment, the known identity of the transmission facility, in this case a cell phone, being carried and/or used by an officer or inmate can be accurately associated with another known identity of another transmission facility, in this case a corrections officer and/or inmate wearing a transmission facility. In this embodiment, the use of an authorized cell phone or an authorized transmission facility by an unauthorized person can be accurately detected and reported. This embodiment can be utilized inside the facility or outside the facility.

In an embodiment, the transmission detection, identification, and reporting system 100 may allow for cell phone owner discrimination. The system may provide for the allowance of authorized cell phones within the prohibited area. The system may detect and identify each cell phone and compare the cell phone identity to the allowed cell phone user list. The system may record all phone use and may automatically alert the facility of all prohibited cell phone use. In addition, each cell phone detection event may be identified with a unique identifier and time code, to ensure proper identification. The CCTV system may also be integrated to ensure greater accuracy identifying illegal use of wireless transmission devices.

Figure 10:
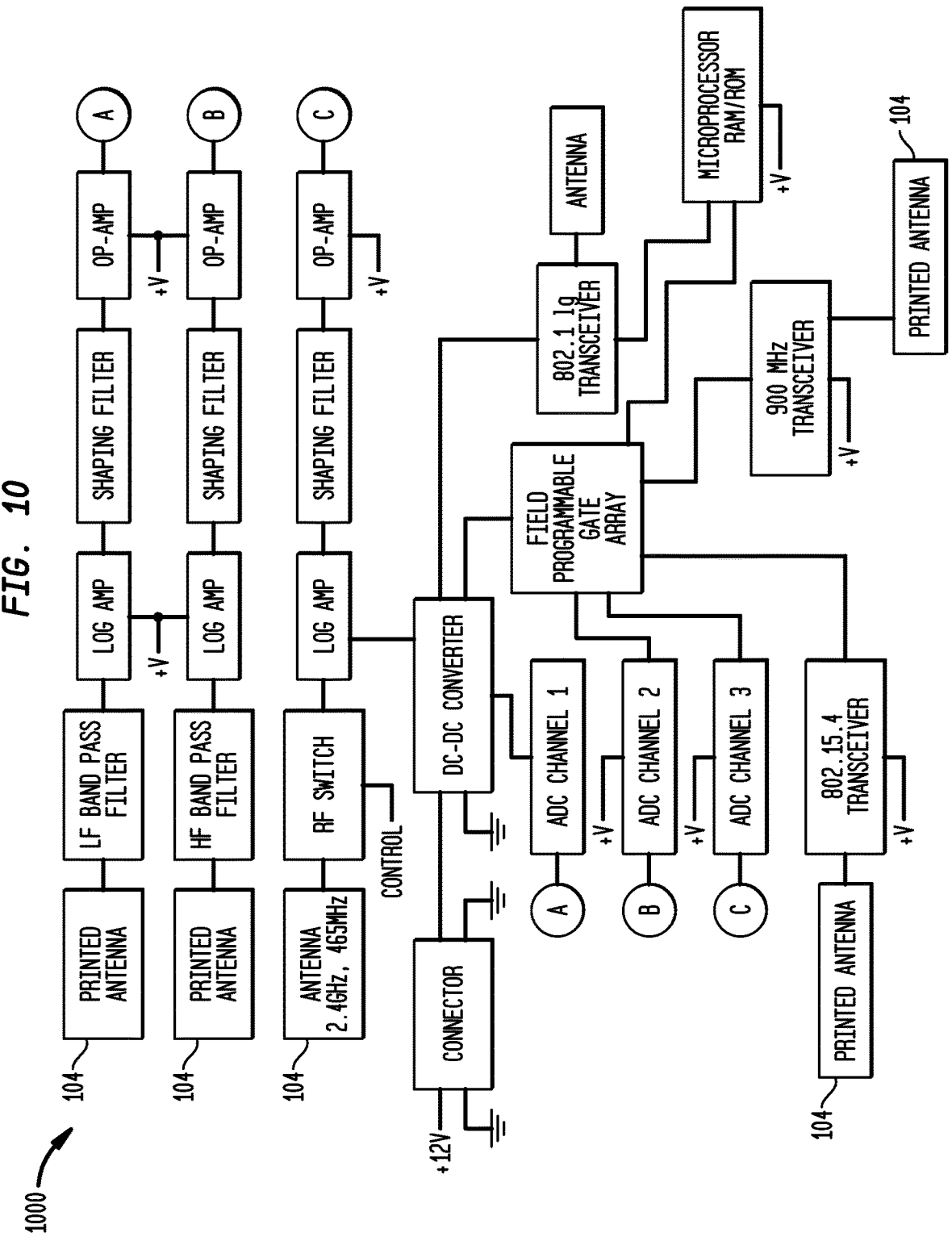
FIG. 10 shows a schematic diagram of a system for detecting signals of a transmission facility.

The cell scan-1 detection system 1000, shown in FIG. 10, is an embodiment of a system for detecting signals of a transmission facility. Antenna 104 receives transmission signals from wireless transmission device (not shown). Antenna 104 may operate, for example in the range of 2.4 GHz with a bandwidth of 465 MHz. The received signals are then provided to a low pass filter and a log amplifier, wherein the level of amplification is based on the input level of the input signal. The amplified signal is next provided to a shaping filter and an operational amplifier. The amplified signals are provided to an analog-to-digital (ADC) converter and provided to a Field Programmable Gate Array (FPGA). Information from the FPGA may be provided to a microprocessor to supplement the processing and control imposed by the FPGA. The FPGA may receive information from dedicated frequency bands (e.g., 9000 MHz) or from known wireless protocols (e.g., 802.15.4). The microprocessor may then determine whether a detected transmission facility for example is a person with a transmission facility (e.g., wristband, a cell phone) and may allow or prevent that person from accessing an area. The microprocessor may also alert the central unit of the persons entering or desire to enter a restricted area. In another embodiment, if the transmission facility, for example, is a cell phone and the cell phone was in use within a restricted area, the cell phone would be identified by the central unit as being in a restricted area, then the system will determine whether the cell phone is authorized or not authorized, then the system would make a determination, based upon set rules, whether to allow or disallow the transmission unit within the restricted area.

The cell scan-1 detection system 1000, shown in FIG. 10, is an embodiment of a system for detecting signals of a transmission facility. An antenna 104 receives wireless transmission facilities in a 2.4 GHz band, with a 465 MHz antenna. In other aspects, the detection system may detect signals in other frequency bands,—for example, 933 MHz, 433 Mhz, 2.4 GHz and other known frequencies. The detected signals are provided to High and Low band RF filter. The RF filters (band pass filter) isolate sets of frequencies for greater sensitivity. For example, the received signals may be provided to a low band RF filter to isolate low band RF signals and high band RF filters to isolate high band RF signals. The isolated RF signals are provided to Log Amplifiers that amplify or boost the signals using known amplification methods. The switch between two WI-FI frequencies switches all three wireless signal inputs into a log amp circuit and then to a smoothing filter to clean up the signal to be analyzed. The signals are then provided to an Operational Amplifier (Op Amp), which amplifies the received analog signal. The amplified RF signal is then processed through an A/D converter, which changes the signal into a digital signal. The signal is then processed in a processing unit (in this case a dedicated Field Programmable Gate Array (FPGA)) and the results are then transmitted via a dedicated 2.4 GHz transceiver unit. The 2.4 GHz transceiver unit has several other applications, and is used to transmit and receive communication information and to connect to external WI-FI communication devices. An example of this is an education system for inmates, medical monitoring equipment in a hospital application, an interactive ID for safe school applications. The 900 MHz transceiver unit is for synch-ing the sensors. The 465 MHz transceiver unit is for communication with inmates bracelets and staff (personal alarm system) as is further discussed in the aforementioned related patent applications. The lower frequency of the 465 MHz unit also provides better wall penetration and alterative wireless communication device with better wall penetration. In another embodiment, the front end of the signal detection circuit includes an amplifier where (e.g., 0-40 dB) gain is added before the RF filter (for example, a 824-849 MHz RF filter) to provide for greater sensitivity. In addition, a mixer and Voltage Controlled Oscillator (VCO) (not shown) is added after the RF filter. The output of the mixer is an IF frequency that is amplified and then provided to a band pass filter (e.g., a 200 MHz filter with a bandwidth of 4 MHZ). The signal is then amplified and then provided to the Log Amp then to an Op Amp and then to the ADC. Depending on the noise floor (which is determined by proper grounding), one with an understanding of RF circuitry would know to have proper impedance matching between components, and will utilize transformer(s) where appropriate. The IF section's general parameters are 70 MHz to 350 MHz and sensitivity is related to frequency and the width of the band pass filter. As would be appreciated, the tighter the width of the band pass, the greater the sensitivity. In another embodiment, the VCO/mixer may be fixed and the IF band pass filter may be the bandwidth of a desired frequency providing for faster detection without the need to scan. Additionally, the greater the dynamic range of the sensor system the greater accuracy and resolution in determining the exact location of the transmission facility.

In an embodiment as shown in FIG. 10, the processing section may be placed on a separate board, this provides for multiple sensors front ends utilizing one back end processing unit. This provide for more cost effective sensors and versatility of assets. This also allows for specific functionality such as antenna array directional location and angle tri-angulation being synchronized to at least one processing unit. It is also anticipated the more expensive processing component be shared such a transmission signal decoding, data analysis, communications and the like.

Figure 11:
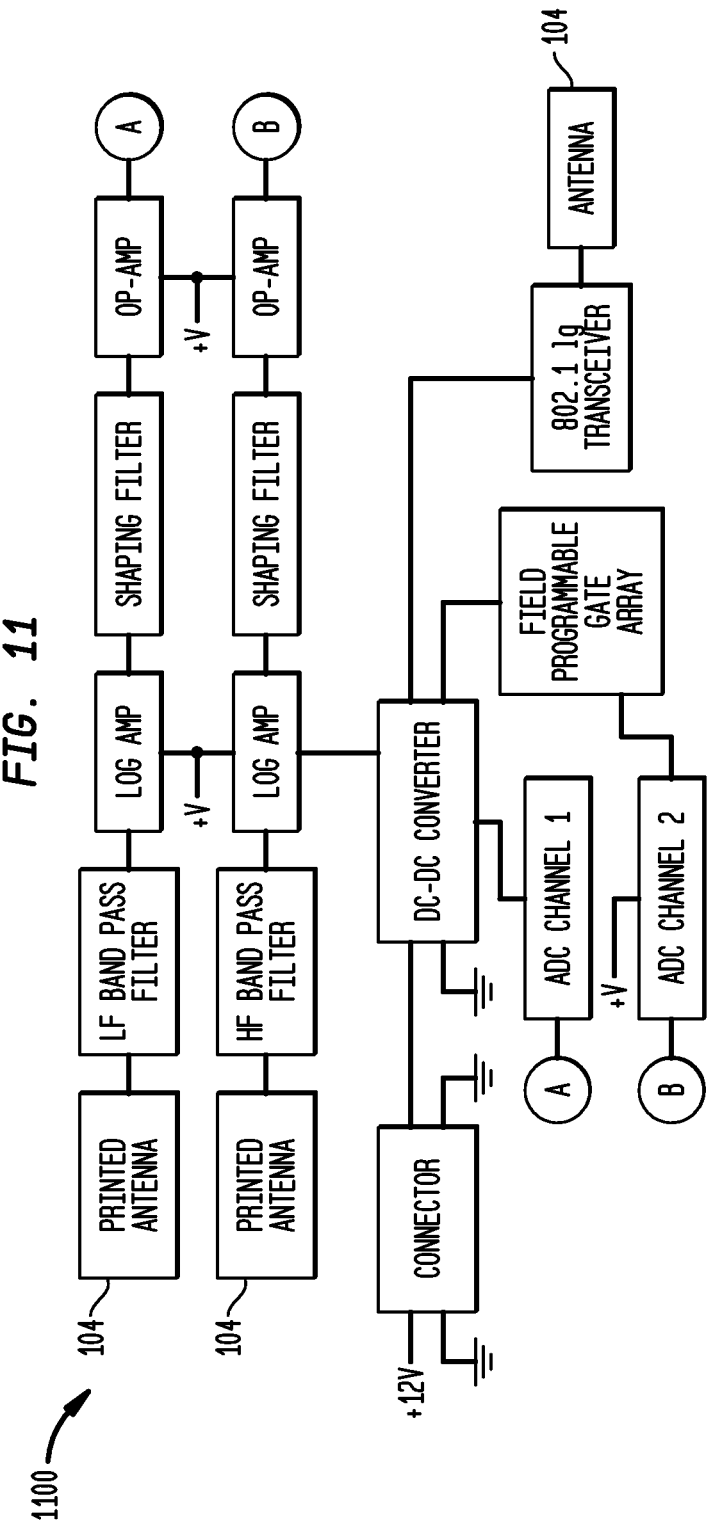
FIG. 11 shows a schematic diagram of an alternate embodiment of a system for detecting a signal of a transmission facility.

The cell scan-2 detection system 1100, shown in FIG. 11, shows an alternate embodiment of a system for detecting a signal of a transmission facility. The RF filters (i.e., band pass filter) isolate sets of frequencies for greater sensitivity, in this example a low band cell phone signals and high band cell phone signals. The operation of the elements in FIG. 11 is similar to that of FIG. 10 and need not be discussed in detail herein.

Figure 12:
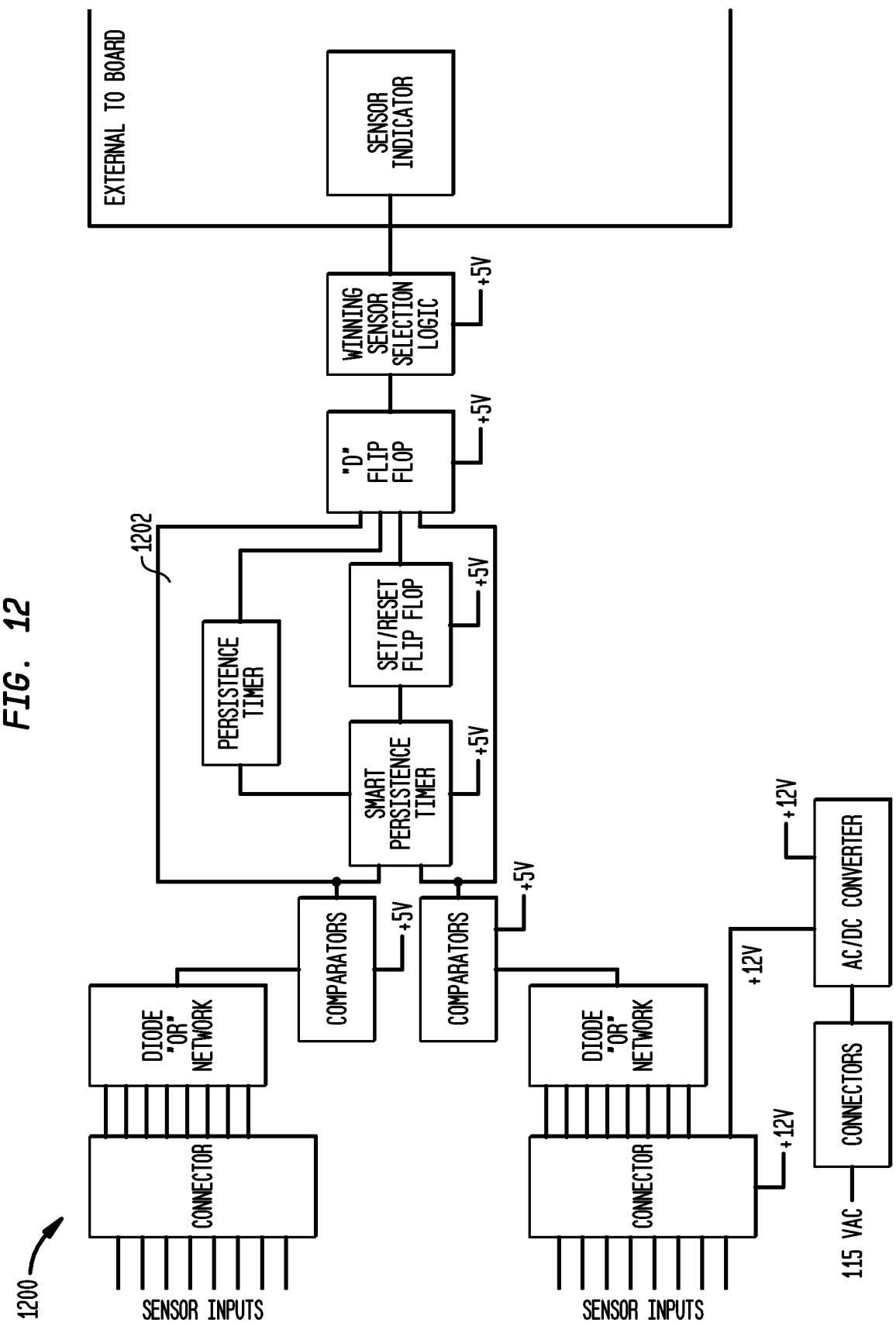
FIG. 12 shows a schematic diagram of a main circuit board within a system for detecting transmission facilities.

The main board system 1200, shown in FIG. 12, is an embodiment of a main circuit board within a system for detecting transmission facilities. The system may be used to determine each signal received is an actual cell phone signal and not a spurious output. Thus, a test may need to be performed that checks for the 'persistence' of the received signal. A persistence test may run a timer 1202 for a minimum required time that may be nearly as long as the time of the shortest signal type expected. If the signal is present at the end of the timeout period, it is less likely to be a spurious response and more likely that it is a cell phone output. For example, if a GSM signal of 500 microseconds long is the shortest duration signal of all the cell phone protocols received, the persistence test may run for 450 microseconds to further ensure that the received signal is not merely a spurious response.

Figure 13:
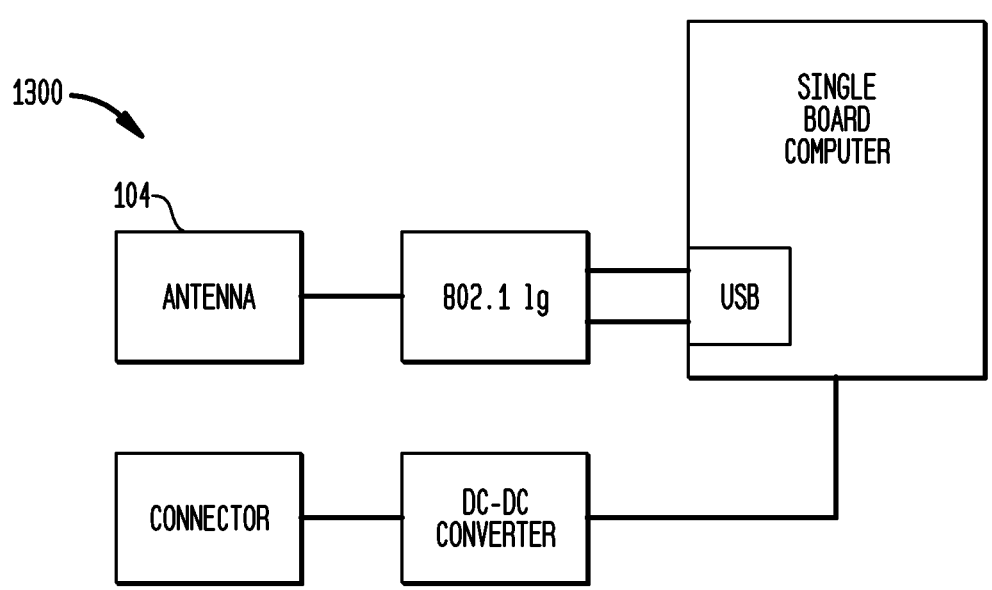
FIG. 13 shows a schematic diagram of a sub-station in a system for detecting transmission facilities.

The sub-station system 1300, shown in FIG. 13, is an embodiment of a sub-station in a system for detecting transmission facilities.

Figure 14:
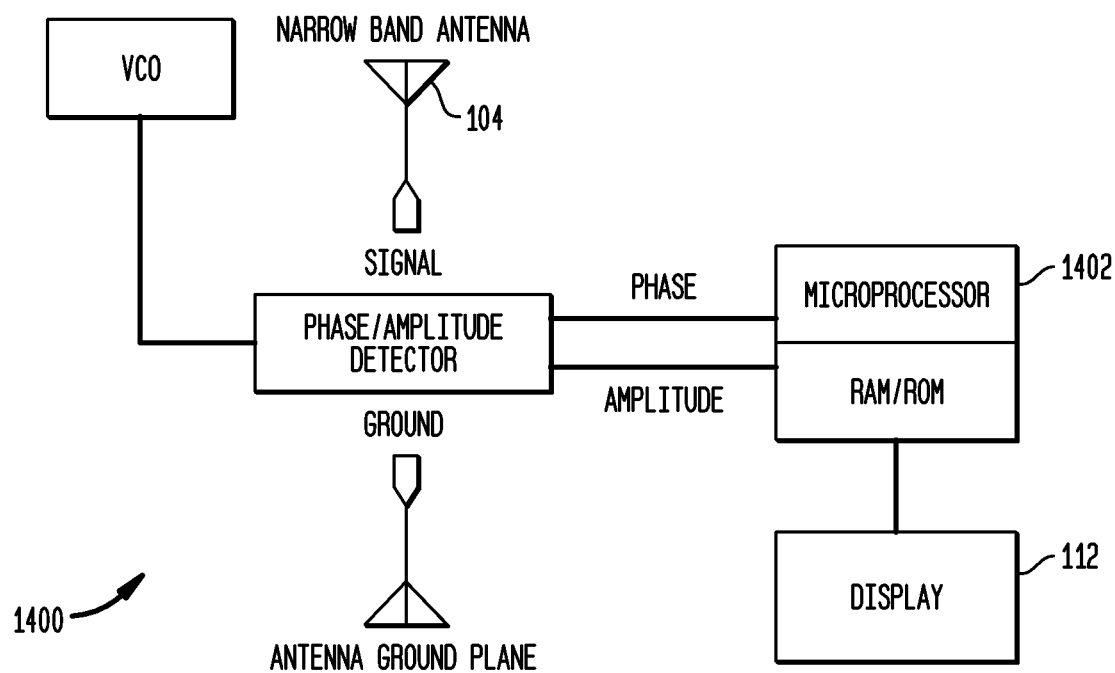
FIG. 14 illustrates a null detection facility.

FIG. 14 illustrates an embodiment of a null detector (1400), wherein the VCO in FIG. 14 tunes to known antenna frequencies and the system detects a null in the known antenna frequencies in which the antenna is detected. As one skilled in the art would recognize the application and can modify the system for greater application and distances.

In embodiments of the system described herein, detection levels may be determined by which output levels are possible with the various cell phone technologies that are in use today. Since the system described is an amplitude system, the strongest and weakest possible signals must be determined in order to identify the system's required dynamic range. Cell phone signals vary from −22 dBW to 6 dBW and this range defines the detection requirements of the system. This translates to a maximum signal of 4.0 Watts at the antenna. The minimum value is equal to 0.006 Watts or 6 milliwatts. Therefore, the dynamic range required is −52 dBm to +36 dBm. In order to achieve such a dynamic range, an amplifier that is gain adjustable is required such that with an input value of +36 dBm, the amplifier is not saturated.

In aspects of the invention, the amplitude of each signal allows the system to determine which sensor has received the largest signal. In similar embodiments several variables are calculated such as wall composition, obstructions, such as steel doors, walls, ceiling, ventilations system and the like. In an integrated embodiment, it then becomes imperative to time stamp each data sample so that other sensors receiving the same signal will be recognized as such when the data is presented for analysis. In another embodiment, such as the hand held sensor, the system can determine and choose which cell phone signal to focus on and may work independently, or in conjunction with other hand held devices which can communicate with other hand held sensors to direct other hand held sensors to tune to the same cell phone to facilitate more accurate location. In the embodiment, the wave shape of the signal is also a characteristic that needs identification. Each transmission type (i.e., CDMA2000, PCS, TDMA, GSM, IS-95, etc.) has a unique wave shape. These wave shapes allow the analysis software to recognize that signals seen in different parts of a facility can be associated with each other (using time and wave shape) and the signal that consistently contains the largest amplitude will be identified as closest to the cell phone transmission and the like.

In embodiments of the invention, signals directed toward an IED (improvised explosive device) may be intercepted, identified and denied service. Such interception may be up to a known range in forward and side quadrants. The identification and determination of the position of the person or persons attempting to activate or contact the IED, whether they are using a satellite phone and/or land-based cell phone may be determined. Cell phones, as well as other RF devices, e.g., garage door openers, walkie-talkie, etc., may be captured and identified.

In embodiments of the invention, when a cell phone, for example, is on, but not in an active communication, the cell phone is essentially invisible to anyone attempting to monitor cell phone activity. In order to be aware of the existence of such "on but not transmitting devices" the system described herein operates as a cell tower. That is, the system actively addresses the problem of cell phone detection by operating (becoming) the tower. A vehicle with similar but modified equipment to that of a cell tower may actively poll the area of phones that are "on but not in a communication of any sort." The vehicle (i.e., Pseudo Tower) collects the current database of active phones and those phones in standby from the tower(s) in the area and uses this data base to poll these phones in order to locate them. Once potential phones that could be possible detonation cell phones are identified and located, the Pseudo Tower would affect a handoff and make itself the active tower. Thus, the captured cell phones are not allowed to rotate back to (i.e., connect to) the local cell phone tower, insuring that any calls attempting to communicate with the detonation cell phone will not be sent. As one of the goals is to identify the person who is attempting to contact the detonation cell phone, a call history of each suspect cell phone may be analyzed.

When a caller attempts to activate an IED, the caller's presence can be identified. Furthermore, the call being made is not forwarded to the detonation cell phone and the IED will not be activated. By determining a peak angle (triangulation) the caller's cell phone/satellite phone signal, the direction of the caller is then known. Direction identification is performed by using a technique such an interferometry. In this case, multiple antennas employing interferometry may be used to scan through the current cell phone traffic identifying first candidate threats and then pinpointing high probability locations which can be viewed through a high powered binoculars to determine whether the candidate is in need of investigation. Criteria for determining which cell locations may be threats is a pole or road sign, etc. The Pseudo Tower may continue controlling all of the phones in the area, preventing any forwarding of calls until all possible threats have been cleared. At this point, the personnel have the option of going after the caller or deactivating the IED, or both. It would be possible to clear the area and detonate the device later if that is a desired plan of action.

Given the varying parameters by which detonation can take place, the Pseudo Tower may also be designed to deny service to any active and inactive phone within a given geographical area and pinpoint the location of said phones.

Satellite cell phone transmission presents a somewhat different problem. Since the transmission from phone to satellite to phone is communicated to a number of satellites, becoming a replacement for the satellite will require cooperation from the provider. Via one or more specific codes, the satellites may be told that the vehicle mounted satellite simulator (i.e., Pseudo Tower) will be taking over the control of phones within a certain radius. Since this is a moving or ever changing circle, the replacement "satellite" will have to continuously update the actual satellite of its position and which phones are being released and which phones are being controlled. Once this function has been implemented, the control of the suspect phones is similar to that of the cell phone. Determining the caller's position and the location of the detonation phone is as above.

Figure 15:
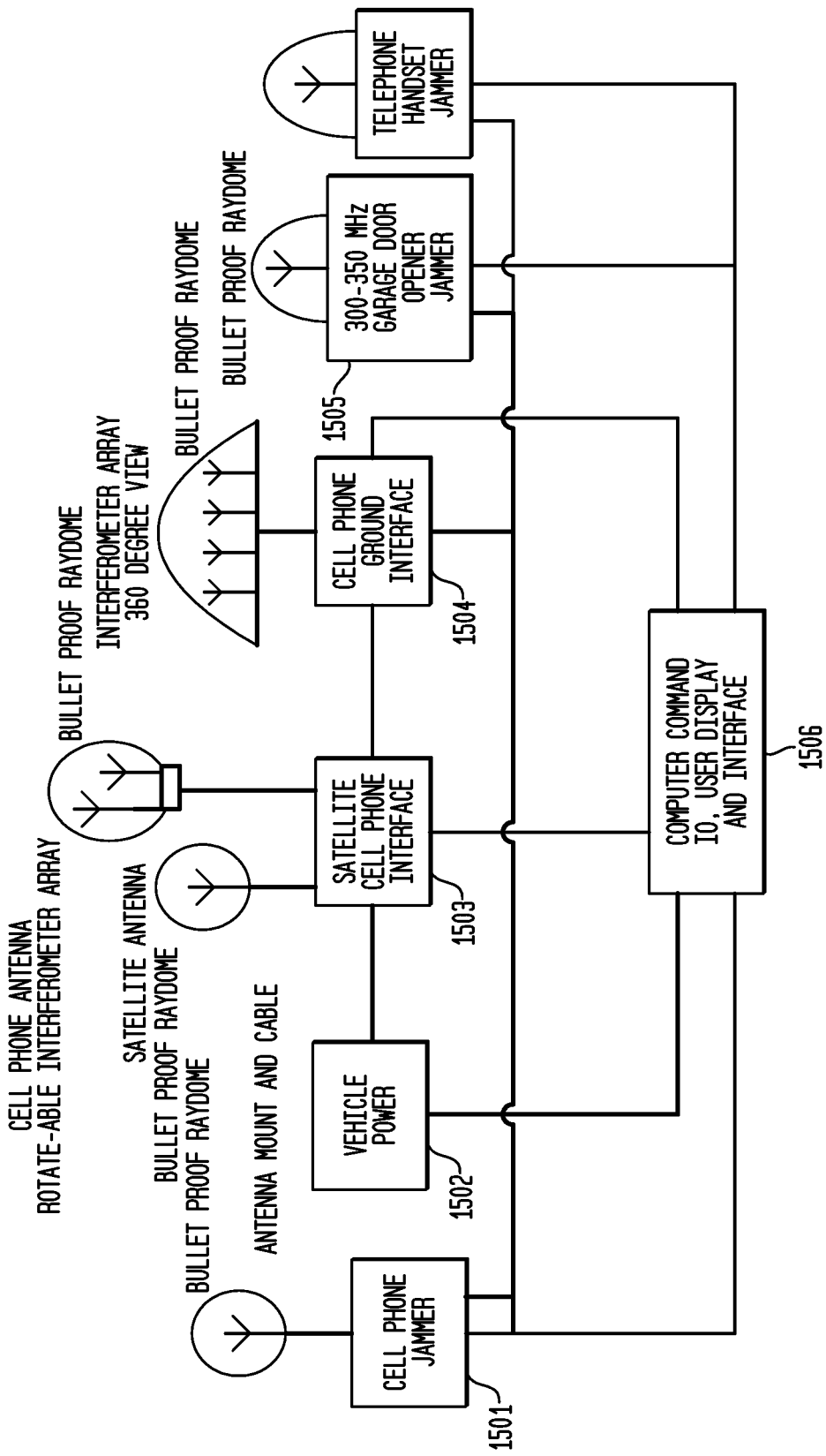
FIG. 15 Illustrates a system for detecting and controlling a transmission facility.

FIG. 15 illustrates an embodiment of a Cell Phone Detection, Control and Position Identification system (1500) in accordance with the principles of the invention which comprises cell phone jammer (1501) system that covers at least one of the known frequency ranges assigned to cell phone or mobile communication devices, a Power Unit (1502) that provides the necessary power to run all the units within the Cell Phone Detection, Control and Position Identification system 1500, Satellite Cell Phone Interface 1503 that operates as an interface and communications unit between the Cell Phone Detection, Control and Position Identification system 1500 and a satellite cell phone provider (not shown), a Cell Phone Ground Interface unit 1504, which includes base station technology for all communication devices operating within an area of interest. Also shown is an optional 300-350 MHz Jammer unit (1505) that operates to jam communication devices that communicate through an intermediary device, such as door openers, Walkie-Talkies and the like. It is anticipated that the system described herein to be modular and expandable to cover the entire frequency spectrum in which transmission facilities (cell phones, mobile communications devices) operate. The Computer Command I/O, User Display and Interface 1506, comprises a communication, command and control system ($C^3$) that manages communication, command and control of the detection system 1500. Unit 1506 may further comprise one or more databases, and/or processors to execute the processing described, herein. Although not shown it would be appreciated that Command I/O unit 1506 may be in communication, via a public or private network, to one or more devices to provide information to or obtain information from remote sites (not shown).

Figure 16:
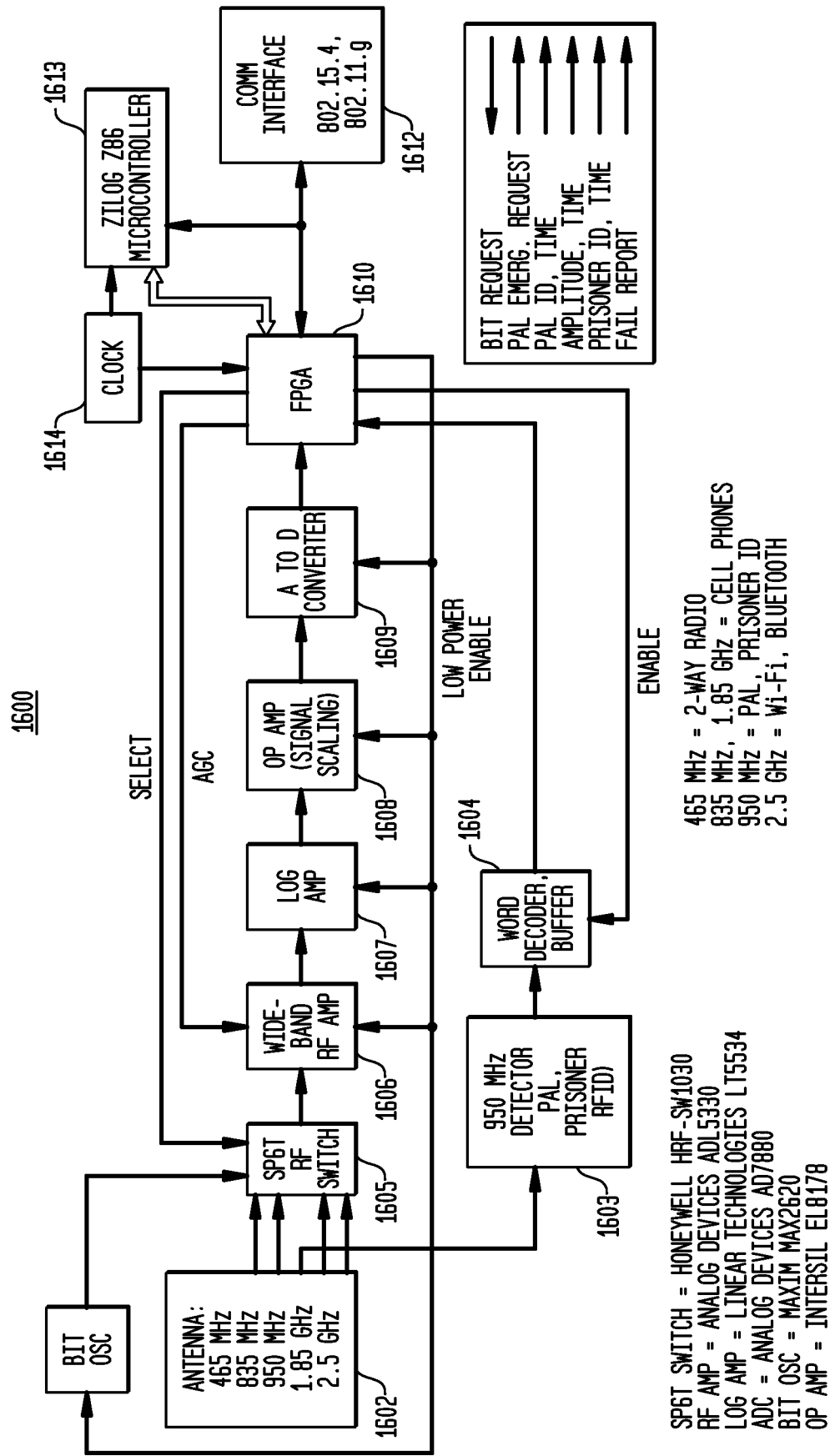
FIG. 16 Illustrates a system for tracking and locating transmission facilities.

FIG. 16 Illustrates a block diagram of an embodiment of a Cell Phone and Wireless Transmission Detection Facility in accordance with the principles of the invention. In the illustrated embodiment 1600, antenna 1602 is a multi-band directional array that operates to detect signals in a low band and in a high band (835 and 1.85 GHz range, respectively), a two way radio band (465 MHz), a WI-FI, a Bluetooth band (2.5 GHz) and PAL (Personal Alarm Locator) band (950 MHz). In the illustrated embodiment, the antenna connects to two components, first to a detector (1603) and also to a decoder (1604). The detector 1603 and decoder 1604 decodes the PAL Identification signal and may further decode biometric information, emergency information. In other embodiments, detector 1603 and decoder 1604 are configured to decode cell phone identifications. Antenna 1602 provides detected signals to a 6 way input switch (1605). The output of switch 1605 is connected to a wideband RF amplifier (1606). Wideband RF amplifier 1606 represents a variable gain amplifier that adjusts the detected signal amplitude based on the band in which a detected signal is detected by antenna 1602. In another aspect of the invention switch 1606 may be connected to a block gain amplifier (not shown) to provide amplification of the detected signal and the amplified detected signal may then be provided to a corresponding RF filter based on the frequency band of the detected frequency.

The wideband RF amplifier 1606 is connected to a Logarithmic amplifier 1607 (i.e., log amp) that amplifies the received or detected signal using an logarithmic function. Log amplifiers are well-known in the art to provide a larger amplification of a weak signal and a smaller amplification of a strong signal. The output of Log amplifier 1607 is provided to an Operational amplifier (OpAmp) 1608. The OpAmp 1608 amplifies the input signal and provides the amplified input signal to an A/D converter 1609 for conversion of the input analog signal to a digital signal. The converted (i.e., digital) signal is then provided to a FPGA (Field Programmable Gate Array) 1610 for subsequent processing. FPGA 1610 controls the operation of the illustrated Cell Phone and Wireless Transmission Detection Facility 1600 through feedback signals to switch 1605, for example. FPGA 1610 controls which signal frequency band and signal frequency is evaluated in what sequence. In the illustrated embodiment, FPGA 1610 communicates with the other sensors and/or access points via a communication interface 1612. In one aspect of the invention, communication interface 1612 may communicate with one or more wireless communication devices that operate using well-known IEEE wireless standard communication protocols (e.g., 802.15 and 802.11). In another embodiment, the communication interface may operate as a transceiver (transmitter/receiver) that may interface with two-way wireless transmission devices such as Walkie-Talkie or cellular telephone phones. The FPGA 1610 also interfaces with a microprocessor 1613, e.g., a Zilog Z86, an Intel xx86 series, Motorola Power PC. Processor 1613 may assist in the decoding, and operation of the Cell Phone and Wireless Transmission Detection Facility 1600. FPGA 1610 and the microprocessor 1613 may be synchronized by a crystal clock 1614. In other embodiments of the invention, the communications may be via a category 5 network interface connection in conjunction to the communication Interface 1612. Although an FPGA is referred to and illustrated in the embodiment of the invention, it would be recognized by those skilled in the art that the processing described by the FPGA may also be performed in other specific processor or processors (e.g., ASIC) or in a general purpose processor which when loaded with and executing an applicable software module converts the general purpose processor into a special purpose processor. As would be recognized, the system shown in FIG. 16 is similar to those shown in FIGS. 10 and 11.

Returning to the embodiment of the Cell Phone Detection, Control, and Position Identification system shown in FIG. 15, control of a wireless communication device (i.e., transmission facility 202) may utilize jammers, base station technology, WI-FI, and 3rd party base station technology, to acquire, control, obtain location and/or to stimulate a wireless communication device, which may be, in an active, non-transmitting, state or in a standby state.

The embodiment shown in FIG. 15 utilizes a high level of signal detection sensitivity to detect the presence of a wireless communication device (transmission facility) within a known distance from the transmission detection facility. As power is a critical component when dealing with wireless transmission devices, the communication protocol typically, by design, causes communication with the largest available signal source. Typically, this is the closest source (i.e., base station).

In accordance with one embodiment of the invention, the jammer units 1501 may jam or interfere with one or more frequencies or frequency bands to force wireless communication device within a local area to lose contact with an available base station and/or access point and to reacquire a connection to a local base station cell tower and/or access point. When the transmission facility (wireless communication device) initiates a process (referred to as hand-shake) to re-acquire a communication link with the available local base station cell tower, the communication link is diverted to, and re-acquired by, the detection system 1500 (which is referred to as a pseudo-base station) due to the greater signal power of the pseudo-base station. In another aspect of the invention, the pseudo-base station power is raised so as to be greater than an actual cell tower signal strength. Thus, the cell phone, for example, will transition to the larger signal strength of the pseudo-base station and establish a communication with the pseudo base station. In a further aspect of the invention, the pseudo-base station may actively poll the area for cell phone (transmission facilities), and trigger the cell phones within an area of interest to cause the cell phones within the area to attach to the pseudo-base station.

In one aspect of the invention, where the application is to control the transmission facility within a local area, and to prevent communications from reaching the transmission facility of interest, the pseudo-base station may deny transmission of signals from the transmission facility to an actual base station or deny transmission of signals from the base station to the transmission facility.

In an embodiment of the invention where it is important to identify and not control the transmission facility within an area of interest providing greater power, polling, control line request, interleaving existing towers and/or jamming to force the transmission facility to communicate its identification parameters. In this embodiment of the invention, gaining control of the cell phone (or wireless communication device or transmission facility) within the area of interest allows the system to prevent incoming and/or outgoing communications. Thus, as the wireless communication device is re-acquiring a communication link with the access point or base station, the wireless communication device provides its identification information that positively identifies each transmission facility within the area of interest. This identification information may be provided to the actual cell tower provider, which uses this information to individually disable the cell phone (transmission facility) from receiving or transmitting data, voice and/or communicating in any manner.

In an embodiment, the detection system 1000 (see FIG. 10) is synchronized with an access point, and/or base station technology. This synchronization allows the tracking and positive identification of each transmission facility within an area of interest. In this example, the transmission facility of interest (a triggering device) may be connected to, or trying to communicate with, another transmission facility, such as a cell phone or a land line phone.

In an embodiment, of the Cell Phone Detection, Control, and Position Identification System shown in FIG. 15, determines the identification of an incoming caller based on information contained in the transmission signal and does not allow connection to the wireless network while determining the location of the caller by triangulating the caller from a plurality of detected signals and tracks the caller thereafter. In this embodiment of the invention, the system shown in FIG. 15 disables the wireless device from receiving or transmitting signals from/to the wireless network and tracks the caller using the wireless device. The Cell Phone Detection, Control, and Position Identification System described in FIG. 15 also has the capacity to track wireless transmission facilities from great distances, and in this application, the system is mobile, therefore, tracking the caller. In one aspect of the invention, where the cell phone or transmission facility information is known, as determined through its communication with a pseudo-base station, for example, additional information can be gathered, requested and/or, extracted from the cell phone or transmission facility. Information such as other transmission devices, cell phones, etc, that have been contacted or which have data transferred may be gathered, requested and/or extracted.

In an embodiment where information redundancy and positive authorization is important and positive identification is critical, the tools used in the school bus safety application egress point and school tracking system have direct applicability to positive identification of personnel and prison system automation, cost effectively tracking and monitoring lower threat classified inmates and staff and inmate safety. Safety application and tracking systems are more fully disclosed in the aforementioned related patent applications, whose contents are incorporated by reference herein. The tools and application described may include facial recognition, retina scan technology, card swipe, fingerprint analysis, in preventing escapes and misidentification within a prison environment.

In an embodiment where positive identification of the transmission facility 202 and positive identification of the user of the transmission facility 202 is important, as discussed earlier hand-held detection units 408 detector decoding module (and or chipset) or a hand-held detection units 408 in sync with the pseudo-base station/wireless access point module provides the location and the identification of the transmission facility 202 or in this case, for example a cell phone or a 802.xx (e.g., 802.11a/b/g/n, 802.15) communication device. In corrections facilities, outside areas of the facility, for example a large area like Angola state prison, a close-circuit television (CCTV) in synchronization with, or in communication, with the hand-held detection units 408 allows the CCTV to focus on the user of the cell phone. The CCTV system feeds images to the facial recognition software and a database of all known personal and/or inmates, to find a match and/or create an entry of new found cell phone and their owner's and or user's identity. In the case of a prison application, building a database of know criminals their associate and biometric information, including facial recognition, for data mining purposes is critical. An example, where inmates are passing contraband and using cell phones to coordinate their efforts, where positive identification of the transmission facility 202 and positive identification of the user of the transmission facility 202 is important, utilizing cell phone identification, location tracking and positive identify of the criminals involved is crucial to preventing and stopping their criminal enterprise.

In an embodiment where positive identification of the transmission facility 202 and positive identification of the user of the transmission facility 202 is important, as discussed earlier the hand-held detection units 408 detector decoding module (and or chipset) or a hand-held detection units 408 in sync with the Pseudo-base station/wireless access point module provides the location e.g., in school safety where a student's location and a perpetrator who preys on school students, the tagging of visitors, student and employees is critical. In this application, CCTV and facial recognition, for data mining purposes of student, facility visitors (wanted or unwanted) is critical. The embodiment includes an allowance unit which determines who is allowed within the facility and/or area and who is suspect and who is a known danger. Tracking all transmission facilities and making positive identification of all communications, utilizing CORI and SORI databases of known perpetrator of students to detect when a threat is near around or in a school facility is critical to school safety.

In embodiments, a method of detecting, identifying and tracking the movements of a specific transmission facility 202 in standby requires provoking and/or requiring the transmission facility to transmit a signal and to detect their unique identification. As discussed and explained earlier, a hand-held detection units 408 with a integrated identification detector/decoding module (and or identification chipset module) and/or a hand-held detection units 408 which functions in conjunction with base station and/or wireless access point technology, blocking and/or jamming technique in concert with the identification function provides the tools to detect the transmission facility, track its location, and to detect its unique identification.

In the embodiment of FIG. 15, an interface with existing communication devices, such as a wireless cell phone provider or WI-FI access provider, may be provided. The interface which will allow and/or deny control is executed by the wireless provider. According, the embodiments shown may also include an interface to the third party controlling unit. For example, the system shown in FIG. 15 may include a system interface with the commercial satellite cell phone provider and control of the cell phones passed between the carrier and the transmission detection, identification, control and reporting system.

In the embodiment of FIG. 15 the detector units (not shown) may include an antenna and a controlling unit, where matching the transmission facilities 202 with its unique identifier is critical for proper identification, tracking and control in this configuration, the detector units may individually control or may direct control over the transmission facilities 202.

Figure 17:
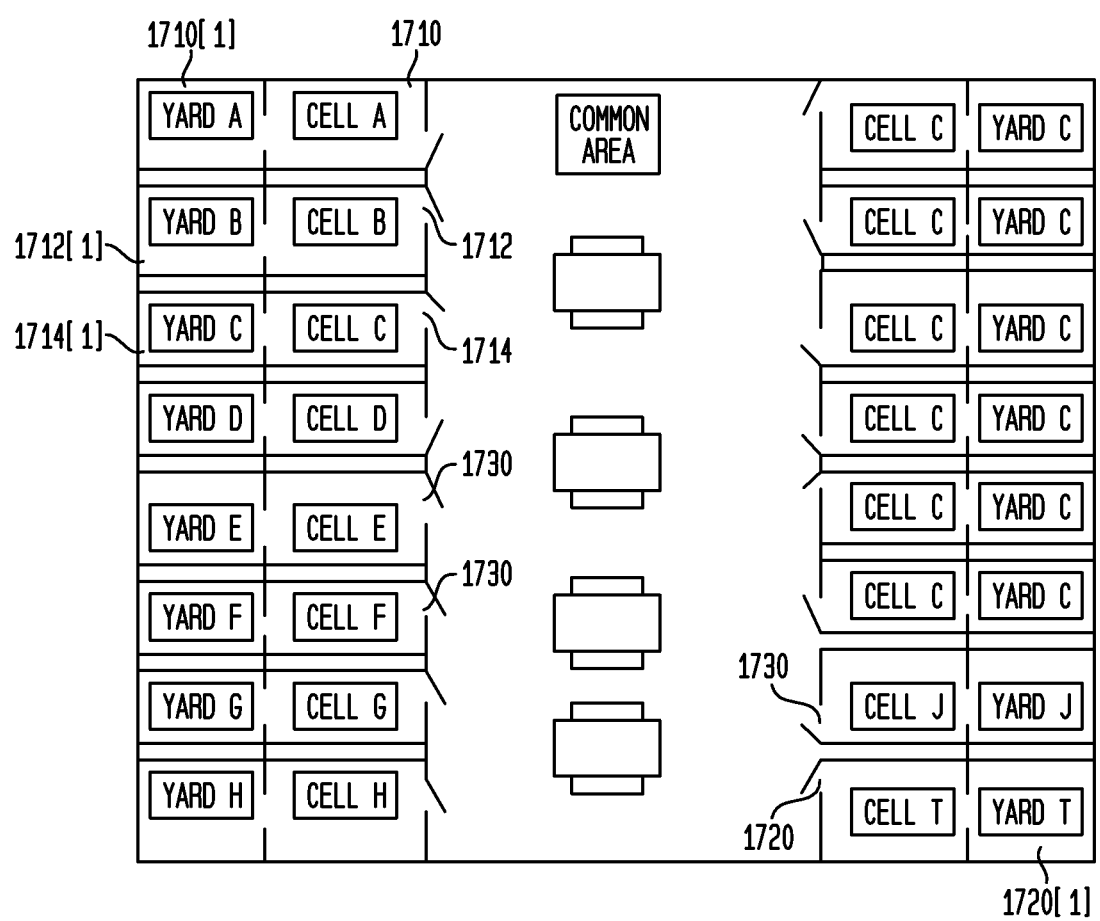
FIG. 17 Illustrates an exemplary corrections facility designed for automation.

FIG. 17 illustrates an embodiment, where it is the intention to run an automated prison to lower the necessary number of personnel and still run a safe and secure facility. This automated facility is controlled by a centralized command and control center and/or a decentralize compartmental command and control center for all functions of the facility including movement of the persons within the facility. In this type of a facility, where complete and accurate identification and location of all personnel is critical, the tracking of individuals, their wireless transmission devices, cell phones, identification units, Walkie-Talkies, and verifying their access to authorized areas, integrating their movement with CCTV and positive facial identification, biometric identification, preventing movement into unauthorized area, developing inclusion zones, creating exclusion zones, ensuring proper count, providing an ability to restrict and/or authorized movement a specific design of the facility and convergence of technology is essential. The technologies discussed herein integrated to the central control provide the backbone and framework to operate such an automated facility, wherein each staff member and inmate transmission facility will allow specific movement throughout the facility. All movement throughout the facility may be monitored through CCTV and facial recognition. At each egress point, movement will be restricted to individual movement through one area to another area of the facility. For example, daily functions include meals, medical, programs, court visits, and recreation, may be functions that may be monitored and controlled. As an example of the facility of the needs within the automation and the parameters and rules, e.g.,—Inmate Movement: need a creation of a Movement list and movement schedule, scheduling resources, allocation seating in particular programs area classrooms, access to computers, access to the Law library, time allocation in program and use of facility assets, Enemy exclusion, (predator sheep wolf exclusion), conflicts in scheduling GED, adult education, culinary arts, anger management, developing waiting list, ability for inmates to signup, morning schedule and movement, afternoon schedule and movement, Pre-trial and religious services scheduling. Data mining database techniques and methodologies may be executed to provide for inmate scheduling movement and allocation of assets for the inmate relying on transmission facility authorization. The transmission facility will control access to all movement, asset resources, doors and egress, facility resources and the time allocation on facility assets and in which movement takes place. Because of minimum human interaction, display kiosks display schedules and inform the inmate where it is scheduled.

In this embodiment, where there is limited corrections personnel, all cells will be designed to allow outdoor access and unit access. The facility structure may need to be modified to allow inmate access to the outdoor area, this design modification eliminates the need for outside movement and still provides greater freedom for the inmates with less need for direct supervision.

In this embodiment, for medical reasons all inmates will wear two transmission detection sensors. Each sensor will monitor biometric signs including heart rate, temperature, and the like. With two wristbands echo cardiogram can be generated that provide for health monitoring and for positive identification. The Cell Phone Detection, Control and Position Identification system 1500 (FIG. 15) will include a detector and decoder for all transmission facilities, which will provide positive identification for all transmission facilities, including cell phone and other hand held communication devices, and the specific individual in position of the transmission facility. All CCTV units will integrate with facial recognition software, all egress points will require biometric checks, such as fingerprint and renal eye scan devices, and this combined with the transmission facility positive identification. The design of the facility is important to provide adequate exercise movement and limited interaction with staff and other inmates. Therefore, a redesign of the facility, to provide services such as decentralized education is important.

In this embodiment, the wireless communication of the sensors will also carry education information and data to each of the inmate cells. As earlier described, the ideal location of sensors may be the water chases to prevent tampering. This also provides the opportunity to have wireless communication with education units within the cells. This wireless communication also provides the ability to as wireless surveillance devices such as cell monitoring into the mix.

In this embodiment where inmate programs, services, commissary, inmate phones, medicine distribution, vending machines, GED education, needs to be inmate specific, positive identification is a critical must. To ensure this outcome, the positive identification of each transmission facility is paramount. An example of this embodiment, when an inmate approaches an education display system, the unique identifier of the inmate's transmission facility, provides information to the transmission facility detector of the unique identifier of the transmission facility. A database controls and provides all the applicable information to provide the correct information for each transmission facility. In this case, the transmission facility is a wristband ID bracelet.

In other embodiment, the transmission facility is a cell phone, PDA or a Wi-Fi appliance, the education display system is an interactive display screen in a school telling the school supervisors that one or more students or personnel needs to turn off his cell phone, or a hospital advising a specific visitor by name, that cell phone even in standby may cause harm to the medical devices being used to treat patients or the transmission facility provides information to the transmission facility detector of a unique identifier of the transmission facility via an interactive screen on the road side to tell a user to slow down as he is speeding. These are just examples of uses of the system illustrated. In addition, the system illustrated may be connected to any data mining database (not shown) to provide customized information to any transmission facility and specific information to a uniquely identified transmission facility.

In an embodiment where the classification of inmates is such where many inmates can co-exist in an inside and outside (minimum security, non-violent, criminals and the like) the use of CCTV, facial recognition and laser microphone, and inmate tracking and a database driven set of rules and parameters, coupled with the technologies mentioned in this application provides the solutions to reduce the number of employees while maintaining a high level of safety and security.

In an embodiment of FIG. 15 the detector units (not shown) may include an antennas 104 and a controlling unit, that are externally integrated with the transmission detection, controlling, identification, and reporting system 1500, where matching the transmission facilities 202 with its unique identifier is critical for proper identification, tracking and location matching of the transmission facility 202 associating a unique identifier with the proper transmission facility 202 may be accomplished through the time of signal arrival, phone type, transmission frequency, time division separation, time sync, channel frequency, cell tower identifier, (cell phone) transmission facility identifier or a combination of one or more methodologies depending on complexity and transmission facility 202 environment and the like.

In the embodiment, of FIG. 15 in a situation where there is a large number of transmission facilities 202 (in this example, cell phones) on a congested highway being able to find all the transmission facility(s) and their accurate location is critical. In addition, being able to continuously track and positively identify each transmission is also critical wherein controlling a significant number of transmission facilities (cell phones) may be necessary. Therefore, specific techniques need to be developed to regulate the frequency band the wireless devices occupy, when and in what order they are processed, the rate and the density and rate in which they are monitored. Techniques discussed earlier describe how to have a cell phone provide their identification. Here we will discuss some of the techniques to regulate the detection, frequency, volume and period of those transmissions.

Knowing the frequency and time of the transmission facility 202 transmissions provides the ability to tighten the bandwidth of the detection sensors, which increases sensitivity, and thus provides greater distance of detection. It also provides an intercept, in time and frequency providing for faster processing of signals. One technique is for the transmission detection sensor to tell the base station and/or enabling technology when to transmit and also indicate the desired response frequency and/or channel. Another methodology is to regulate and/or schedule the transmission time of the base station(s) and/or enabling technologies within geographical areas and set parameter on the direction, radiation pattern, zone, and strength of the signal being transmitted to enable regulating a number of transmission facility(s) contacted and/or regulating the number of responding transmission facilities.

Figures 1, 19A:
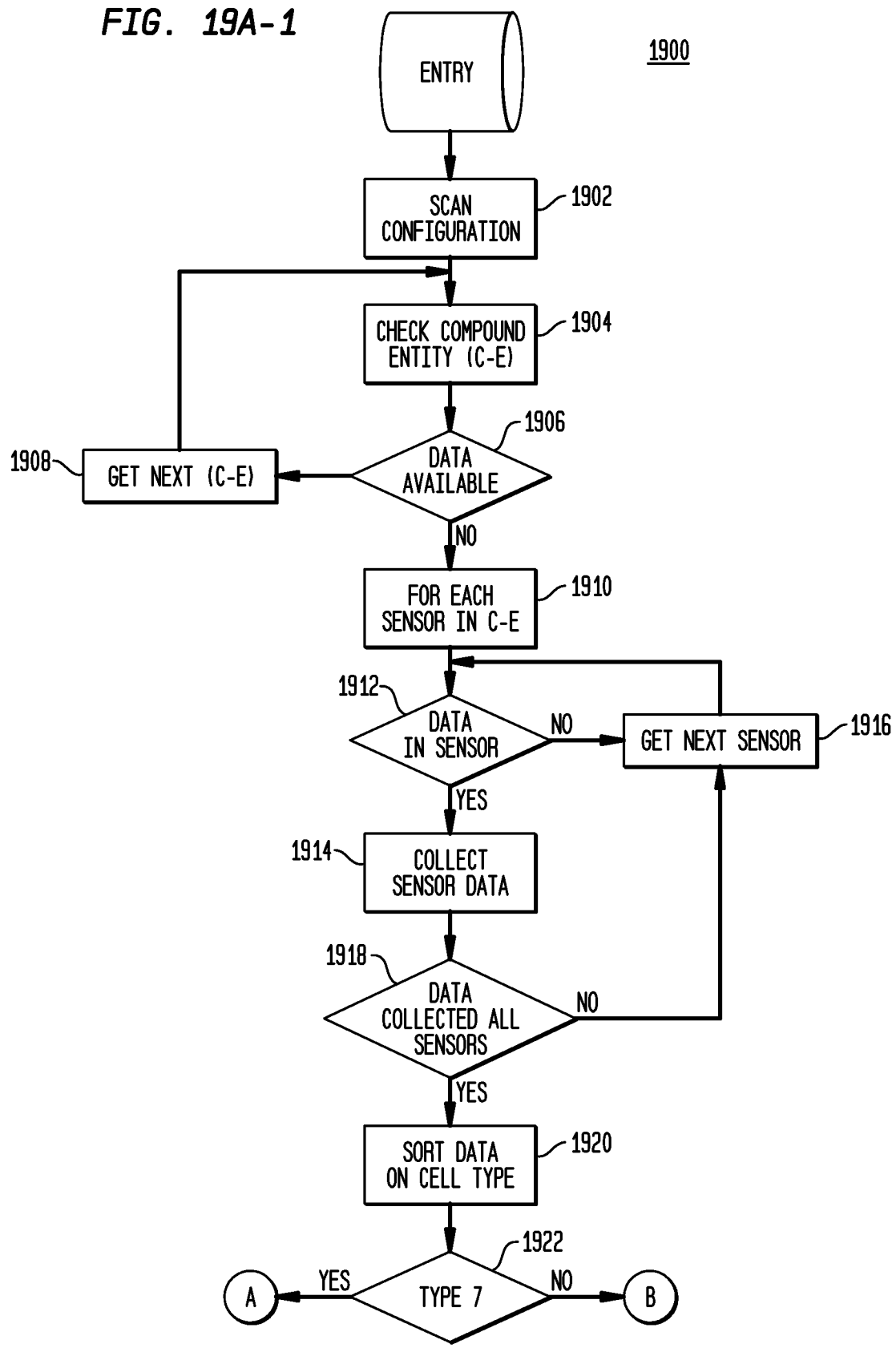
FIG. 19A, as presented on two pages identified as FIG. 19A-1 and FIG. 19A-2, illustrates an exemplary process for determining a location of a transmission facility in accordance with the principles of the invention.
Figures 2, 19A:
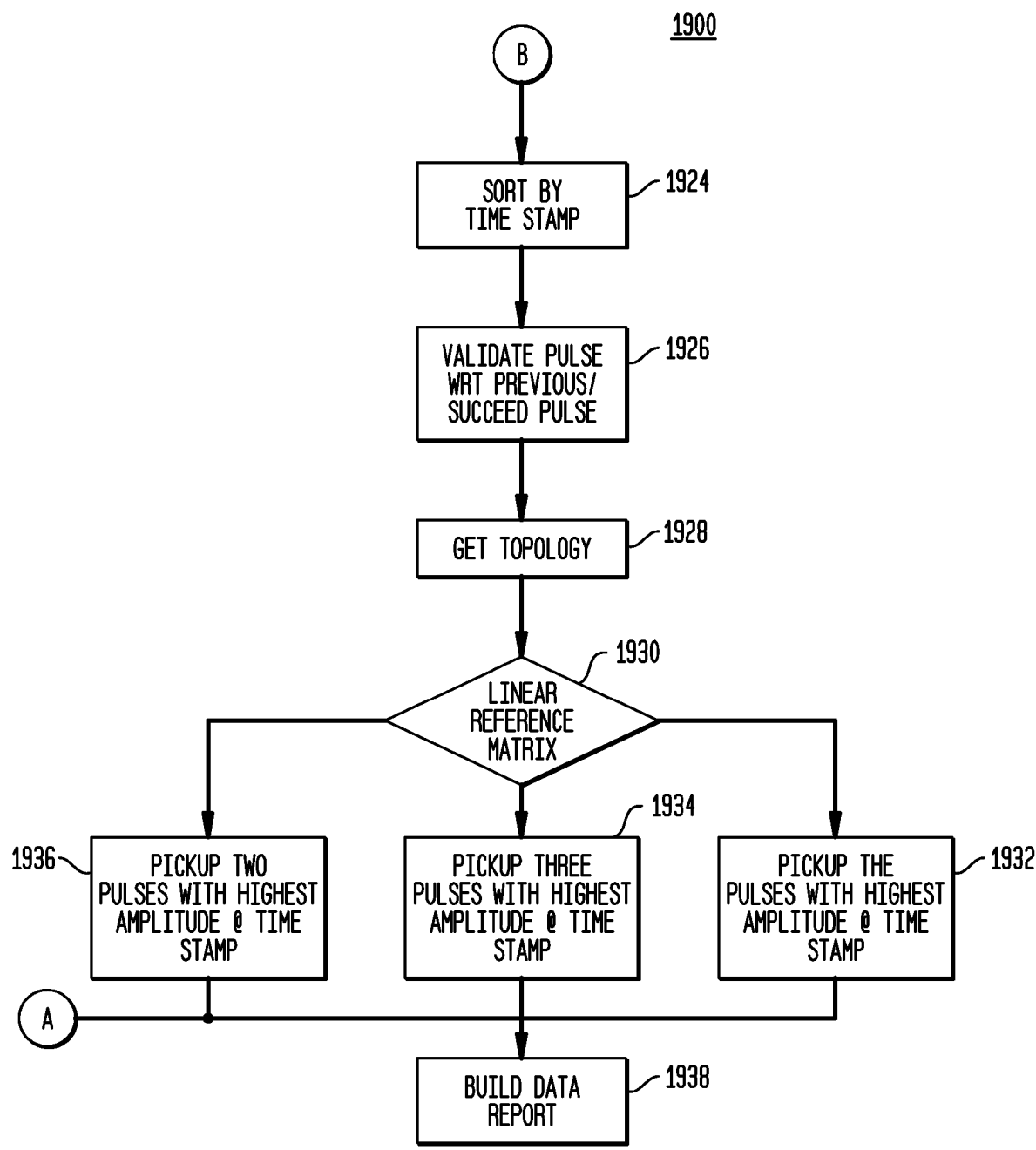

In an embodiment, in a corrections complex, such as Angola State Prison, or a arbitrarily defined area where transmission facilities 202 are prohibited except for authorized transmission devices, the transmission detection, controlling, identification, and reporting system 100, whether internal or external to the facility, may control, identify and prohibit transmissions from transmission facility 202 depending on the location or approximate location of the transmission facility 202. There are a variety of methods that may be employed in the determination of the location of a transmission facility 202. Methods include (i) a cell-sector system that collects information pertaining to cell and sector ID's, (ii) the assisted-global positioning satellite (GPS) technology utilizing a GPS chipset in a mobile communication facility, (iii) standard GPS technology, (iv) enhanced-observed time difference technology utilizing software residing on a server that uses signal transmission of time differences received by geographically dispersed radio receivers to pinpoint a user's location, (v) time difference of arrival, (vi) time of arrival, (vii) angle of arrival, (viii) triangulation of cellular signals, (ix) location based on proximity to known locations (including locations of other radio-transmitters), (x) map-based location, or any combination of any of the foregoing, as well as other location facilities known to those of skill in the art. In one aspect of the invention, the location may be determined using a linear equation-based method as shown in FIGS. 19A/19B.

In an embodiment of the transmission detection, controlling, identification, and reporting system 1500 whether to control the transmission facility 202, may be determined by location of the transmission facility 202, type of transmission facility 202, identification of transmission facility 202, time of transmission of the transmission facility 202, frequency of the transmission facility 202, based on type of base station technology and/or location of base station technology and the like.

In an embodiment of the transmission detection, controlling, identification, and reporting system 1500 where the system is in synchronization with base station technology and techniques correlate the wireless signals, wherein the unique identifier is supplied by the base station when the transmission facility is stimulated by the jammer and/or base stations unit. Then the transmission facility is tracked and its interest is related to its location to the road, other variables include whether it is alone or it is in the hands of an individual and the like. The unique identifier is provided by the signal detection sensor or the base station unit and is used to synchronize with the base station identification and the location of the transmission facility.

In an embodiment of FIG. 15, the transmission detection, controlling, identification, and reporting system 1500 may also transmit the type, time, frequency of the wireless transmission facility of interest to a base station. The base station may then provide the system with the unique identifier of the detected transmission facility or the base station may detect a transmission facility at a specific frequency and the transmission detection, controlling, identification, and reporting system 100 tunes to that frequency to determine the location and unique identifying information of the transmission device. The system 100 may then compare the unique identifying information to a data base (not shown). The information and the parameters obtained from the data base may then be used decide how to treat the transmission facility; what to do with the transmission facility depending on where the transmission facility is considered friend or foe (i.e., allowed or disallowed).

In an embodiment of the transmission detection, controlling, identification, and reporting system 1500 where the transmission detection units includes a transmission decoding unit the system determines the location and the allowability of the transmission unit by comparing the transmission found with allowable or non-allowable transmission facility lists.

In an embodiment shown in FIG. 15 of the transmission detection, controlling, identification, and reporting system 1500, the base station indicates there is a transmission facility within the area covered by the transmission detection, controlling, identification, and reporting system 1500. The base station provides at least one unique identifier to the transmission detection, controlling, identification, and reporting system 1500. For example, the base station may provide at least one of: a frequency; a type of transmission facility; a time of arrival (TOA), an IMEI and other similar identifiers (e.g., encoded IMEI). The transmission detection, controlling, identification, and reporting system 1500 determines the location of the transmission facility, depending on the provided parameters, directs the base station and/or recorder, jammer, CCTV . . . ) to perform a set of actions. Some of the actions to be performed are jam the signal specific to the cell phone, deny service (Denial of Service (DoS)) to the cell phone, allow the continued receiving and allow transmission of the detected transmission, record the content of the transmission, provide an indication that the transmission is allowable. In addition, the provided parameters may change depending on location, and other variables depending on application parameter and the like.

In an embodiment shown in FIG. 15 of the transmission detection, controlling, identification, and reporting system 1500 where detection system is separate from the discriminator unit, the discriminator unit may also include the controlling unit (base station technology and the like). In this case, when a unique set characteristics (parameters) are received by the detecting unit, and/or system 1500, which then provides information to the discriminator unit and/or controlling unit, which then passes back the correlated transmission facilities (the controlling unit, software radio, and the like) this information is processed. For example, a cell phone on the side of the road, with a person talking on it may not need to be disabled, in contrast to a cell phone in standby located within a zone of danger (60 meters of the road) may need to be controlled and disabled.

In an embodiment, the system 1500 will allow an authorized transmission facility to continue and/or provide the ability for the wireless transmission, (i.e., to talk and/or to receive calls) depending on the configuration and application. In an embodiment of the transmission detection, controlling, identification, and reporting system 100 where detection system is separate from the discriminator unit, in this case the discriminator unit may also be the controlling unit (base station technology and the like). The system 1500 may further provide instruction to the controlling unit to allow or disallow transmission facilities, determined by their location.

In an embodiment of the transmission detection, controlling, identification, and reporting system 1500 the system compares the obtained information and depending on whether the detected transmission facility is determined to be a potential danger, the system may take the incoming transmission facility and determine its position prior to disallowing further transmission. This process is accomplished by knowing an identification of the transmission facility and using the information obtained by the controlling facility (frequency, time, type, channel, etc.) and searching for the incoming call signal. For example, in an improvised explosive detection (IED) situation, finding the trigger man may require the detection, identification and location determination in real-time. The array antennas will utilize large front end gain for the greatest distance. As discussed previously, jamming the area, to gain control of the transmission facility is one method of capturing the transmission facility. The ability exists to then track the trigger man from his current location and where he goes for investigative reasons.

In an embodiment shown in FIG. 15 of the transmission detection, controlling, identification, and reporting system 1500 where transmission facility retrieved data may be used to locate threats to personnel, and or prevent an escape. Recovered transmission facility data may be used to track co-conspirators location and/or identify of an unauthorized transmission facility.

Figure 18:
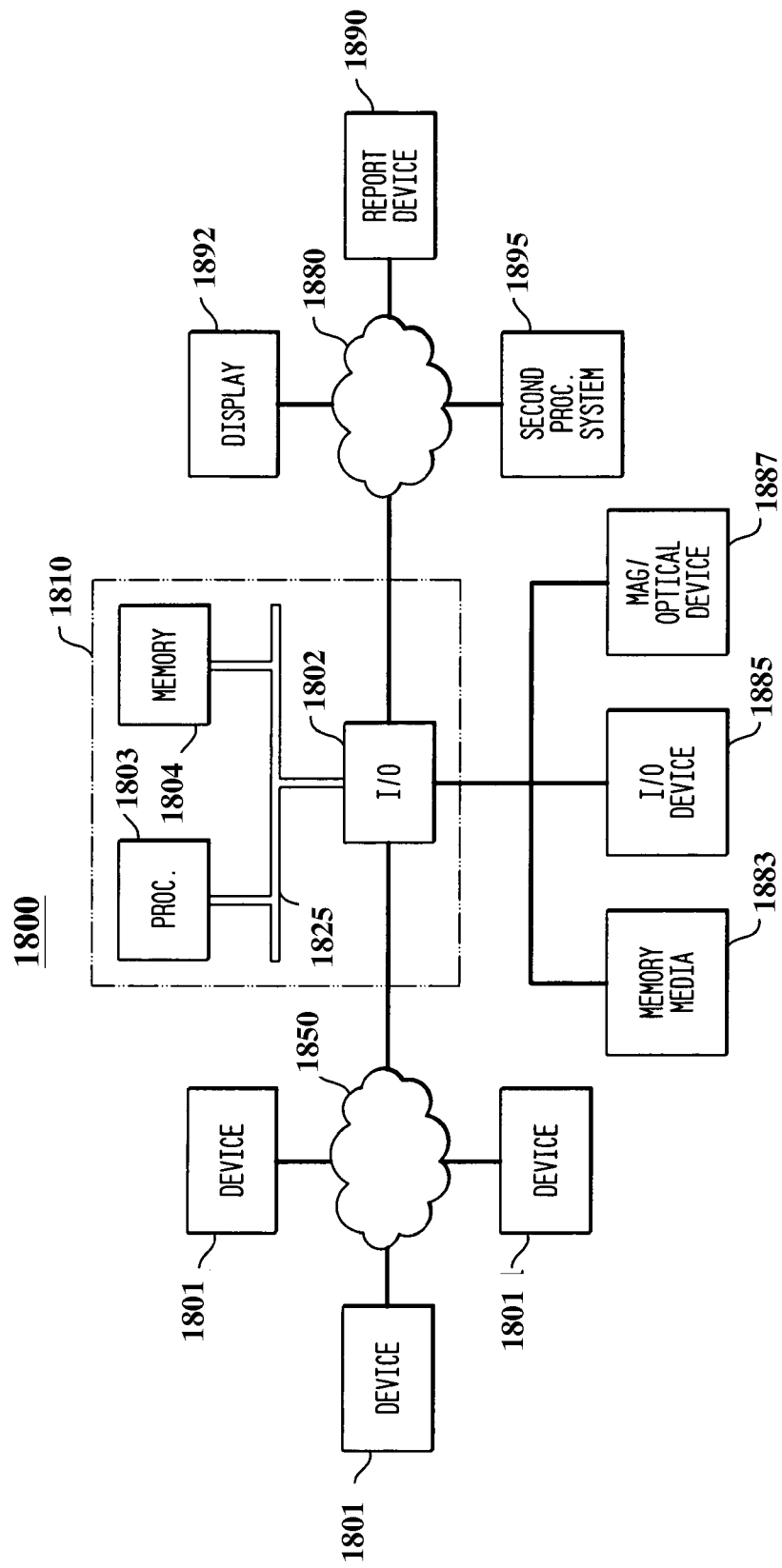
FIG. 18 illustrates a system for implementing the processing described herein.

FIG. 18 illustrates a system 1800 for implementing the principles of the invention shown herein. In this exemplary system embodiment 1800, input data is received from sources 1801 over network 1850 and is processed in accordance with one or more programs, either software or firmware, executed by processing system 1810. The results of processing system 1810 may then be transmitted over network 1880 for viewing on display 1892, reporting device 1890 and/or a second processing system 1895.

Processing system 1810 includes one or more input/output devices 1802 that receive data from the illustrated sources or devices 1801 over network 1850. The received data is then applied to processor 1803, which is in communication with input/output device 1802 and memory 1804. Input/output devices 1802, processor 1803 and memory 1804 may communicate over a communication medium 1825. Communication medium 1825 may represent a communication network, e.g., ISA, PCI, PCMCIA bus, one or more internal connections of a circuit, circuit card or other device, as well as portions and combinations of these and other communication media.

Processing system 1810 and/or processor 1803 may be representative of a handheld calculator, special purpose or general purpose processing system, desktop computer, laptop computer, palm computer, or personal digital assistant (PDA) device, etc., as well as portions or combinations of these and other devices that can perform the operations illustrated.

Processor 1803 may be a central processing unit (CPU) or a special purpose processing unit or dedicated hardware/software, such as a PAL, ASIC, FGPA, operable to execute computer instruction code or a combination of code and logical operations. In one embodiment, processor 1803 may include, or access, code which, when executed by the processor, performs the operations illustrated herein. As would be understood by those skilled in the art when a general purpose computer (e.g., a CPU) loaded with or accesses code to implement the processing shown herein, the execution of the code transforms the general purpose computer into a special purpose computer. The code may be contained in memory 1804, may be read or downloaded from a memory medium such as a CD-ROM or floppy disk, represented as 1883, may be provided by a manual input device 1885, such as a keyboard or a keypad entry, or may be read from a magnetic or optical medium (not shown) or via a second I/O device 1887 when needed. Information items provided by devices 1883, 1885, 1887 may be accessible to processor 1803 through input/output device 1802, as shown. Further, the data received by input/output device 1802 may be immediately accessible by processor 1803 or may be stored in memory 1804. Processor 1803 may further provide the results of the processing to display 1892, recording device 1890 or a second processing unit 1895.

As one skilled in the art would recognize, the terms processor, processing system, computer or computer system may represent one or more processing units in communication with one or more memory units and other devices, e.g., peripherals, connected electronically to and communicating with the at least one processing unit. Furthermore, the devices illustrated may be electronically connected to the one or more processing units via internal busses, e.g., serial, parallel, ISA bus, Micro Channel bus, PCI bus, PCMCIA bus, USB, etc., or one or more internal connections of a circuit, circuit card or other device, as well as portions and combinations of these and other communication media, or an external network, e.g., the Internet and Intranet. In other embodiments, hardware circuitry may be used in place of, or in combination with, software instructions to implement the invention. For example, the elements illustrated herein may also be implemented as discrete hardware elements or may be integrated into a single unit.

As would be understood, the operations illustrated may be performed sequentially or in parallel using different processors to determine specific values. Processing system 1810 may also be in two-way communication with each of the sources 1801. Processing system 1810 may further receive or transmit data over one or more network connections from a server or servers over, e.g., a global computer communications network such as the Internet, Intranet, a wide area network (WAN), a metropolitan area network (MAN), a local area network (LAN), a terrestrial broadcast system, a cable network, a satellite network, a wireless network, or a telephone network (POTS), as well as portions or combinations of these and other types of networks. As will be appreciated, networks 1850 and 1880 may also be internal networks or one or more internal connections of a circuit, circuit card or other device, as well as portions and combinations of these and other communication media or an external network, e.g., the Internet and Intranet.

FIGS. 19A/19B illustrates an exemplary process for determining a location of a wireless transmission using an amplitude based algorithm in accordance with the principles of the invention. In this illustrated process, the sensors associated with a known configuration (block 1902) are polled or interrogated at a known rate. For example, if a time to detect a wireless transmission is desired, then the known rate may be such that all the sensors are polled at least once within the desired detection time. In the illustrated aspect of the invention shown, the sensor configuration is setup such that a plurality of sensors may be assigned to a single group (referred to as "compound-entity"). The sensors within the compound-entity may be considered as a single entry that is polled or interrogated (block 1904). The use of such a grouping of sensors is advantageous as it enables the data analyzing of all the sensors within a system within a desired cycle time. If no signal activity is detected by any of the sensors within the compound-entity (block 1906), a next compound-entity is selected and analyzed (block 1908).

When activity is determined to exist within a compound-entity (block 1910), then data of each sensor within the compound-entity is individually polled (block 1912). The sensors provide information regarding the detected signal, such as signal type, amplitude, and time of detection. In addition, the detected signal may include a unique identifier associated with the transmission device. The unique identifier may be a coded value that represents a unique identifier or may be an identifier such as an IMEI value.

At block 1914, the information from each sensor, whether from a signal compound-entity or multiple compound-entities, is collected and stored in a buffer for subsequent processing. Blocks 1916 and 1918 determine whether all the sensors within the compound-entities that have detected data have been processed.

At block 1920, the collected information is stored based on type of detected signal. At block 1922, a determination is made whether the detected signal type is "unknown", i.e., referred to as a type 7. If yes, then a data report is constructed at block 1938.

Otherwise, the stored signal types are again stored based on a time stamp of each signal at block 1924. At block 1926, the collected pulses associated with a time stamp are then validated based on the time of reception of the pulses being within a known time period among the time stamps of pulses before and after a time stamp of a current pulse At block 1928, a configuration of the system (i.e., a topology) is obtained to provide a location element (installation Type) to each of the sensors (compound entity) identified as having a detected signal. The configuration may represent a map of the location of each sensor, wherein the location may be a relative value with respect to a predetermined point on the map or the location may be an absolute value obtained, for example, using a Global Positioning Satellite (GPS) system. The GPS location of the sensors may be obtained automatically for each sensor, using a GPS receiver installed in each sensor; or may be obtained manually when the sensor is installed. A data base, stored in a memory, may be used to represent the mapped locations.

At block 1930, select the topology that has the highest amplitude at a detection time stamp. One sensor is selected if the topology is a reference. Two sensors with the highest amplitude are selected if the topology is linear (i.e. the two sensors are adjacent). A matrix topology is one wherein three sensors with the highest amplitude are selected.

At block 1930, a reference sensor is selected as that sensor having a highest amplitude at a known time stamp. (i.e., clock reading). Based on the position of the reference sensor with respect to the sensor configuration, information from either one (block 1936) or two additional sensors is selected (block 1934). In the first case, when only one additional sensor is to be used, a sensor with a next highest amplitude is selected. In the second case, when two additional sensors are to be used, then the two sensors with the second and third highest amplitudes are selected.

At block 1938, a data report is constructed utilizing the information from the two or three selected sensors. That is, based on the topology or configuration the number of sensors in addition to the reference sensor is determined and selected. In one aspect of the invention, the amplitudes of the detected signals at a corresponding time stamp may be used to determine a location. In another aspect the time stamp may be determined using a known clock signal that may be applied to each of the sensors. Or the time stamp may be determined more accurately within each sensor based on a provided input signal. Or the time stamp may be determined from an external source, such as a GPS (Global Positional Satellite System). In one aspect, the FPGA of each sensor may include a time clock that provides an accurate time stamp.

Figures 1, 19B:
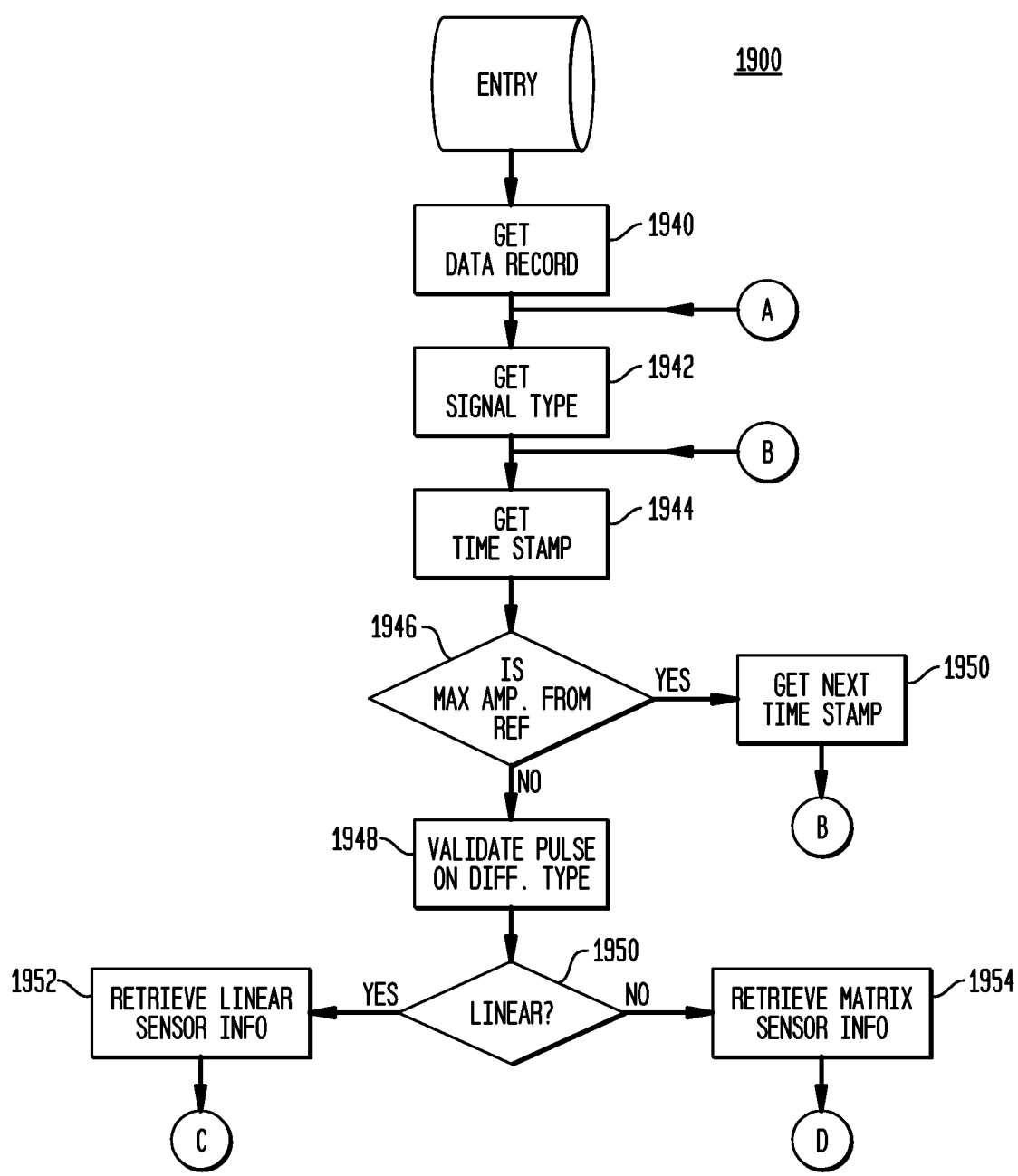
FIG. 19B, as presented on two pages identified as FIG. 19B-1 and FIG. 19B-2, illustrates an exemplary process for determining a location of a transmission facility in accordance with the principles of the invention.
Figures 2, 19B:
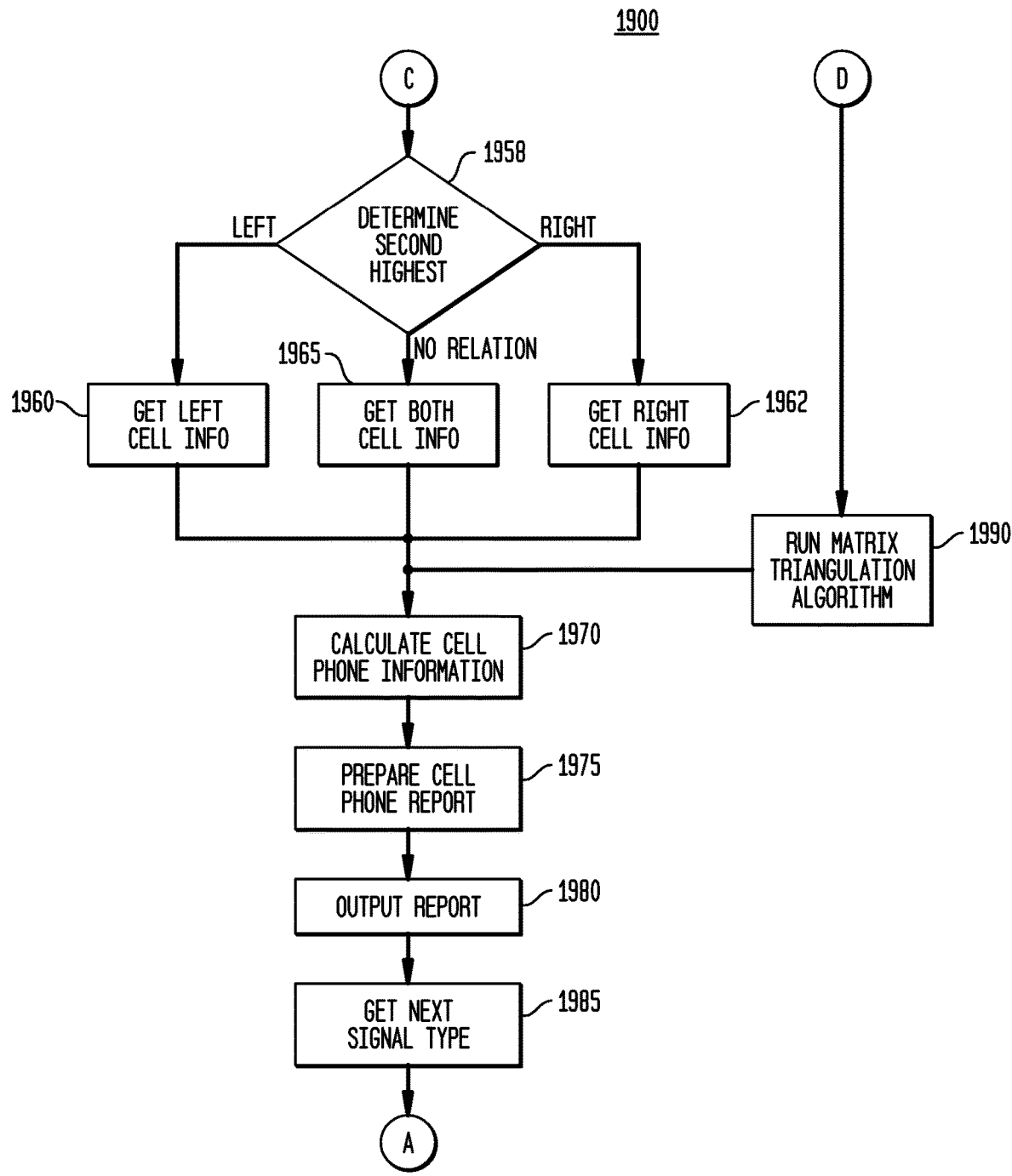

Referring now to FIG. 19B, the data report is accessed at block 1940. For each signal type and each time sample within the data report, a determination is made regarding whether the reference signal is associated with the highest amplitude. At block 1942 a first signal type is accessed from the data report. At block 1944, information associated with a pulse of the first signal type of a first time stamp is obtained. At block 1946 a determination is made whether the maximum amplitude is associated with the reference signal. If the answer is yes, then a pulse associated with a next time stamp is obtained at block 1956 and processing continues at block 1944.

Otherwise, the pulse is validated on the different signal types. For example, validation may be a process based on each cell phone signal type's fingerprint (waveform/envelope). At block 1950 a determination is made whether the information associated with the pulse at the timestamp is associated with a linear algorithm. Here one key point is that the linear sensor is installed between two cells. If the answer is positive, then information regarding a linear sensor configuration is obtained at block 1952. At block 1958, a determination is made regarding the location of the second sensor with respect to the sensor with the highest amplitude. This determination is made, in part, based on the topology information. If the answer is the second—highest is located to the left of the highest sensor, then information regarding the left cell is obtained at block 1960. If the answer is right of the maximum amplitude, then information regarding the right cell is obtained at block 1962. Otherwise, information regarding both left and right cells of the highest sensor is obtained at block 1965.

At block 1970, the information calling type, call duration, starting time, phone type, etc., and the location of the detected wireless transmission device (e.g., cell phone) is determined. At block 1975 a report is prepared, which includes the determined location of the detected device and at block 1980 the report may be outputted to a display device or a second processing system (not shown).

At block 1985, a next signal time is obtained from the initial data report and processing continues at block 1942.

Returning to block 1950, if the answer is that the pulse associated with the time stamp is not a linear topology, then processing proceeds to block 1990, where a matrix triangulation algorithm is implemented.

In one aspect, an open area may be divided into several small areas, wherein for each small area, the center of each area is taken as the absolute location of the small area and stored in a database. For the case where three sensors are selected, a ratio of a difference of the detected amplitudes values at each sensor is determined and assigned to corresponding areas. This information is further stored in a database. When detected pulses are checked, a difference in the detected amplitudes is determined along with a ratio. The ratio is then used to retrieve the expected sensor location(s). Processing then proceeds to block 1970 to calculate the location of the detected device.

Figure 20:
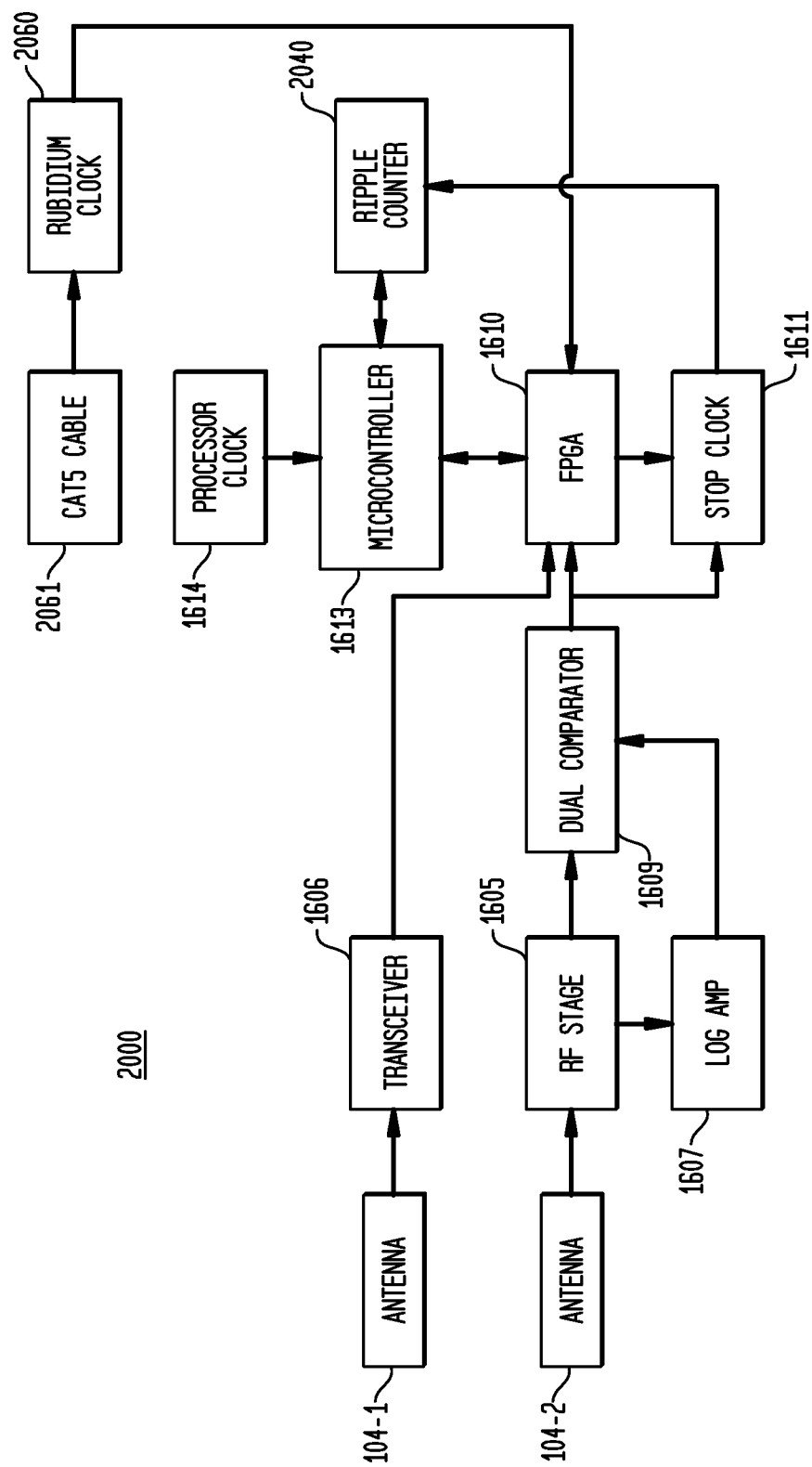
FIG. 20 illustrates a block diagram of a sensor apparatus in accordance with the principles of the invention.

Referring to FIGS. 20-23, which are duplicated from FIGS. 3, 4, 5A and 5B, respectively, of the aforementioned incorporated Ser. No. 12/157,530 patent application, FIG. 20 represents a block diagram of the system shown in FIG. 16, further illustrating the components for generating a high-precision clock signal. In this illustrated case, a Rubidium clock, 2060, provides a base clock signal, generally in the order of 100 MHz. A ripple counter 2040 operates on the Rubidium clock signal to generate a high precision clock signal that is used to determine a time when a signal is detected.

Figure 21:
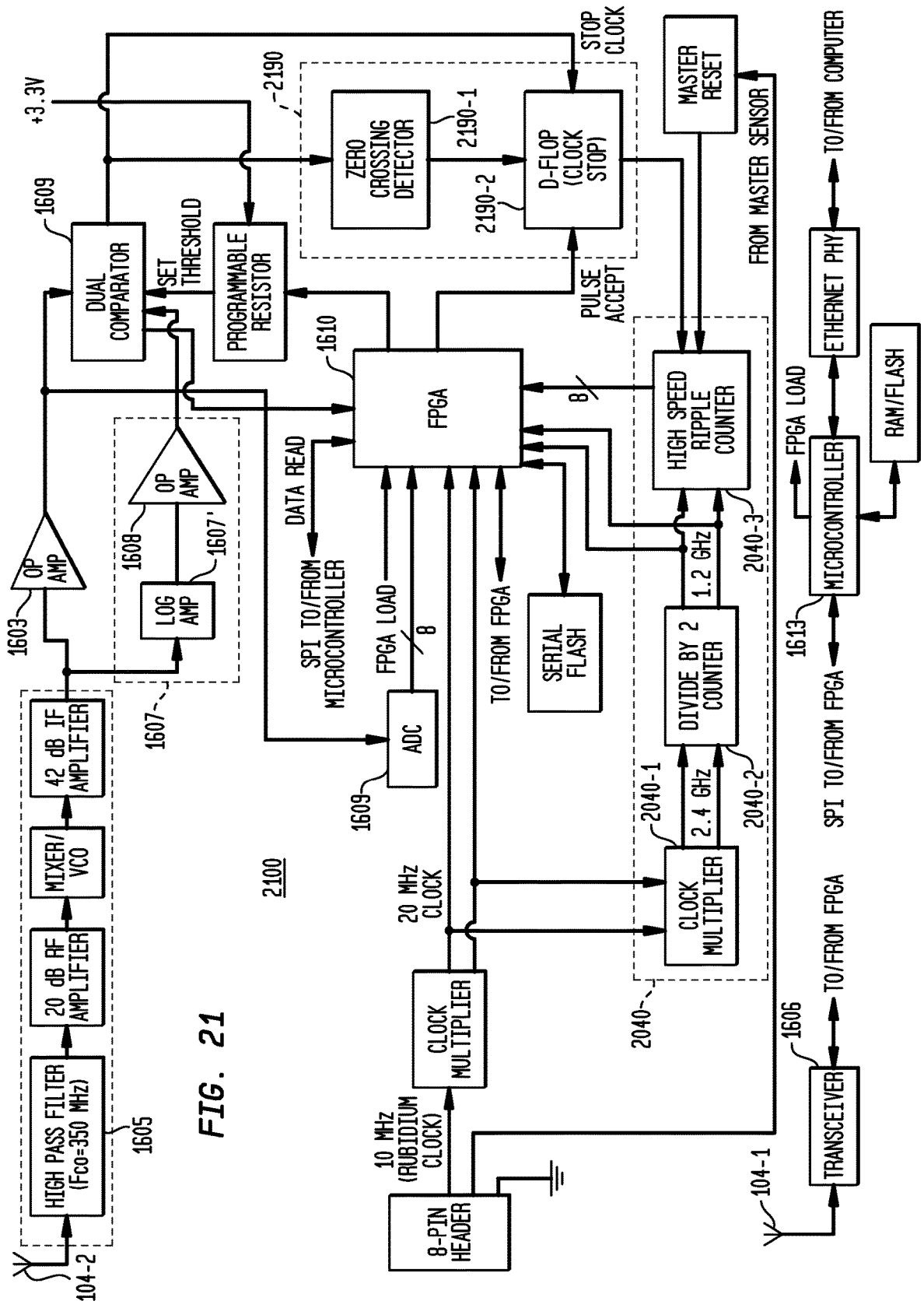
FIG. 21 illustrates a second block diagram of a sensor apparatus in accordance with the principles of the invention.

FIG. 21 illustrates in further detail the generation of the high precision clock signal and the zero-crossing circuit used as a stop clock signal, which is generated when a signal is detected by the antenna 104-1, 104-2. As noted above the rubidium clock signal is provided to each sensor with substantially the same delay bias and, thus, the high precision clock signals have substantially the same reference point from which the clock reading $R_i$ may be determined.

Figure 22:
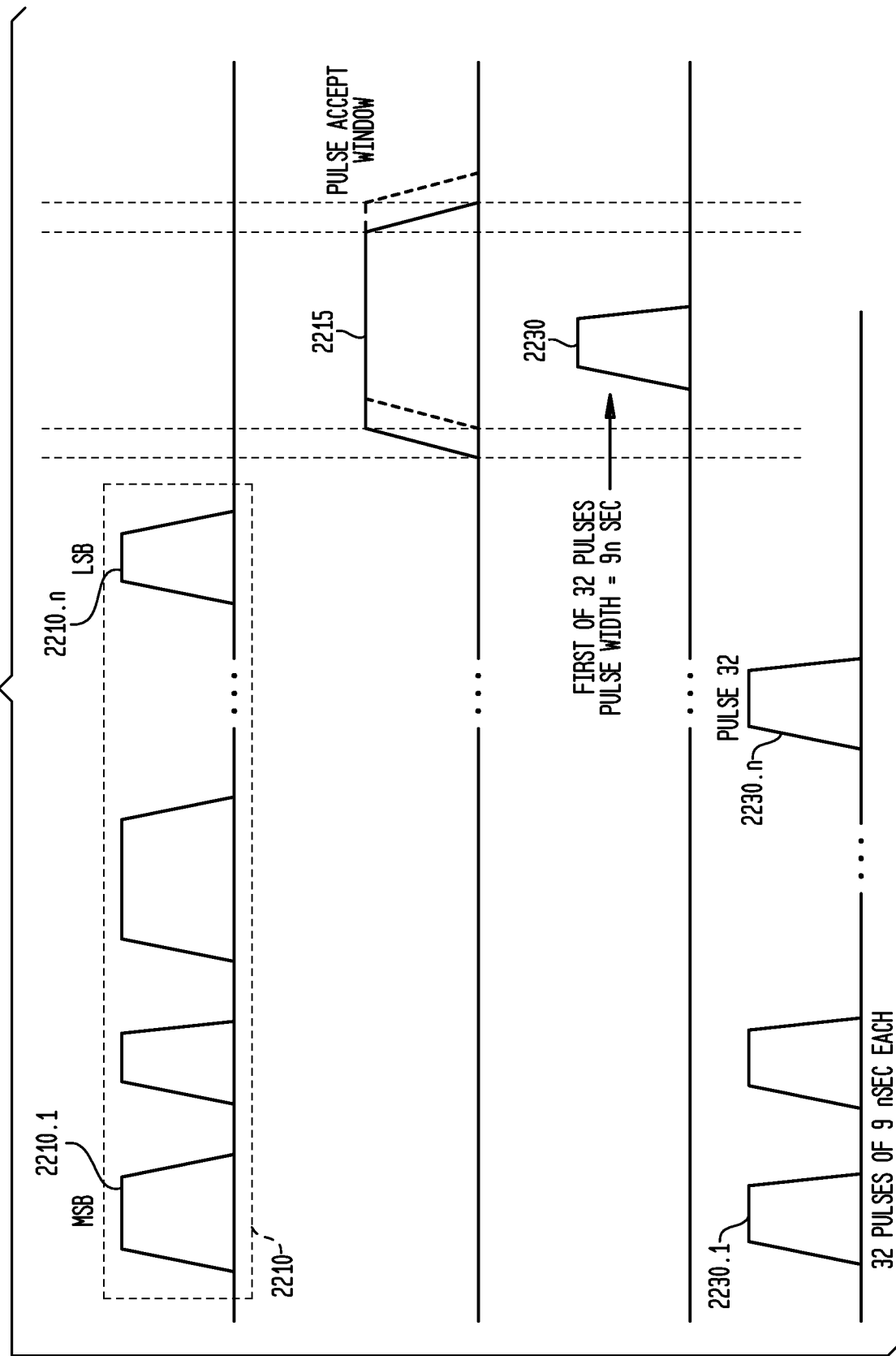

FIGS. 22 and 23 illustrate exemplary clock signals that may be used in determining a clock reading $R_i$.

Details discussion of the processing shown in FIGS. 20-23 is provided in the incorporated Ser. No. 12/157,530 patent application, with regard to FIGS. 3, 4, 5A and 5B and the description of these figures is repeated herein in its entirety.

FIG. 20 illustrates a high-level block diagram of an exemplary sensing system in accordance with the principles of the invention. In this illustrated embodiment, antenna 104-1 receives low power data signals from a transmission facility or wireless transmission device (not shown). The data signal is provided to transceiver (transmitter/receiver) 1606 that down-converts the data signal and provides the data signal to processor 1610. In this case, processor is implemented as Field-Programmable Gate Array (FPGA). Processor 1610—may similarly be presented as a general purpose processor unit or an Application Specific Integrated Circuit (ASIC).

Antenna 104-2 receives a Radio Frequency (RF) signal and provides the RF signal to RF stage 1605 for down-converting and amplification. The down-converted signal is then applied to a "log" amplifier 1607. Log amplifiers are known in the art to provide a gain value to a received signal based on the magnitude of the received signal. In this case, the gain is applied according to a logarithmic function rather than a linear function. The output of RF stage 1605 and log amplifier 1607 are applied to a dual comparator 1609.

One output of the dual comparator 1609 is applied to FPGA 1610 and one output is applied to a stop clock circuit 1611, which determines a time when a designated received pulse is detected. FPGA 1610 provides an enable signal to the stop clock circuit 1611. An output of the stop clock circuit 1611 is applied to a ripple circuit 2040, which maintains an accurate time to determine an accurate time when the designated received pulse is detected.

Also shown is a high-accuracy clock 2060 that provides a clock signal to FPGA 1610. Preferably, clock 2060 is a rubidium clock having a measurement accuracy in the order of picoseconds. The rubidium clock 2060 may be connected to a dedicated category 5 cable 2061 that allows connection of one or more devices requiring a high-accuracy clock signal.

Processor clock/FPGA clocks 1614, 2060 are provided to the respective devices for the internal operation of these devices. The processor clock and FPGA clock signals may be generated independently.

FIG. 21 illustrates a further detailed block diagram implementation of a sensing system in accordance with the principles of the invention. In the illustrated embodiment, antenna 104-1 receives a data signal, as previously described, and applies the received signal to transceiver 1606. The output of transceiver 1606 is applied to FPGA 1610. In one aspect of the invention, the data signal is transmitted on a carrier frequency of 434 Mhz. Antenna 104-2 receives a signal and applies the received signal to RF stage 1605. RF stage 1605 is composed of a low-pass filter to remove high frequency signals, a 20 dB (decibel) amplifier to amplify the remaining received signal, a mixer to down-convert the received signal to a known baseband signal and a second amplifier to amplify the baseband signal. The output of the RF stage 1605 is applied to a log amplifier 1607 and to operational amplifier 1603. The log amplifier is composed of log amplifier 1607' and operational amplifier 1608. Log amplifier 1607 amplifies the received signal based on a logarithmic function, as previous described, and operational amplifier 1608 (1603) amplifies the received signal based on a linear function.

The output of the operational amplifier 1603 is applied to an Analog/Digital Converter 1609 that digitizes the received signal, which is then applied to FPGA 1610. In addition, the output of each of the log amplifier 1607 and the operational amplifier 1608 is applied to a dual comparator 1609, which compares the applied inputs to known threshold values to reduce spurious signals. The log amplifier signal and the operational amplifier signal are each applied to the FGPA 1610 and the output of the comparator 1609 is further applied to a stop clock circuit 2190. Stop clock circuit 2190 is composed of a zero-crossing circuit 2190-1 and a trigger device 2190-2—(e.g., a D-flip flop). Zero-crossing circuit 2190-1 is known in the art to provide an indication when a modulation of a signal crosses a zero-voltage value. The zero-crossing indication is then provided to trigger circuit 2190-2 which provides a digital representation of the zero-crossing.

The digital representation output of the clock stop circuit is next applied to the ripple counter circuit 2040. In this illustrated embodiment, ripple counter circuit 2040 is composed of a clock multiplier 2040.1 that multiples a clock signal received from FPGA 1610. The multiplied clock is provided to a divide by two (/2) circuit 2040.2 to reduce the clock rate. The reduced clock rate is applied to a ripple counter 2040.3. In this illustrated case, the ripple counter 2040.3 provides a signal to FPGA 1610 when a stop clock signal is received from stop clock circuit 2190.

In a preferred embodiment, a 160 MHz clock is provided to clock multiplier 2040.1 which produces a clock rate of 2.4 GHz. The 2.4 GHz clock is divided to a clock rate of 1.2 GHz to operate ripple counter 2040.3. The output of the divide by two device 2040-2 is presented to the FPGA 1610, representing the most significant bit, prior to the ripple counter. In this case the ripple counter 2040.3 operates in the order of nanosecond resolution. Although, the clock rate is shown as being increased and then decreased, this is merely a function of an implementation and is not to be considered the only means of generating a clock signal or that the clock is limited to a 2.4 GHz signal.

FPGA 1610 receives a ripple counter value associated with stop clock indication. The ripple counter value represents a time value, which in conjunction with similar ripple counter values may be used to determine a location of a cell phone or similar transmitting device. Hence, a highly accurate clock may be generated in each sensor based on a common input clock signal.

FIG. 22 illustrates an exemplary message protocol in accordance with the principles of the invention. In this exemplary message, a preamble message 2210 is composed of a plurality of data bits represented as 2210.1-2210.$n$. Each of the data bits 2210.1-2210.$n$ may represent one or more additional bits. For the purposes of describing the principles of the invention, each illustrated data bit 2210.1-2210.$n$ represents a single data bit. The preamble message may represent an identification of a user, a characteristic of a user, biometric data of a user or combinations thereof. Preamble 2210 further represents a marker and a trigger that identifies the beginning of the reception of a transmission of particular user. In one aspect of the invention the number of bits in preamble 2210 is fixed at sixteen (16). However, it would be recognized that the number of preamble bits may be selected based on desired transmission characteristics and have been contemplated and considered within the scope of the invention described herein.

After reception of a number of known preamble bits 2210.1-2210.$n$, a pulse projection window 2215 is open for a known period of time to capture the occurrence of a next pulse 2230 in the pulse sequence. This next pulse is referred to as clock stop pulse. The clock stop pulse is used to accurately determine end of transmission as described with regard to FIG. 21. Clock stop pulse 2230 is further composed of a plurality of individual pulses 2230.1-2230.$n$, that are distributed among the clock stop pulse. The detection of at least one pulse 2230.1-2230.$n$ satisfying at least one known criterion is used as a time marker to mark the end of transmission from a user.

In one aspect of the invention, the preamble pulses are selected as being of a duration of 71 nanoseconds uniformly distributed over a 1.136 microsecond time frame. The pulse window is established as 50 nanoseconds and each of the pulses 2230.1-2230.$n$ within clock stop pulse 2230 are represented as 32 pulses of a 2.2 nanosecond duration. It would be recognized that the preamble described herein is representative of a single aspect of the invention and that the particular values described herein are provided to limit the scope of the invention to this value.

FIG. 23 illustrates an exemplary Time Division Multiple Access (TDMA) protocol 2350 in accordance with the principles of the invention. In this exemplary protocol, each user is assigned a time slot in which a user may transmit a message to a sensor or substation (see FIG. 1) by the central office. The time slot assignment may be established dynamically by the central office 110 or substation 108 based on the number of users within a general range of the central office. In another aspect, each of the users may have allocated a predetermined time slot and when the user enters a general area managed by the central office or substation, the central office 110 or substation 108 may register the user and determine whether conflicts may exist. Conflict resolution may for example be resolved by incorporating a CDMA (Code Division Multiple Access) protocol (not shown) on each of the conflicting users. In this case, two users may thus transmit in the same time slot by the central office assigning and providing a known code to each of the conflicting users. CDMA technology is well known in the art and need not be discussed in detail herein.

In the illustrated protocol shown, each user is allocated a one millisecond (1 ms) time slot 2310 (or a time slot which varies from 500 microseconds to 20 milliseconds) in which to communicate with a sensor. That is, the preamble 2210 is received substantially at the beginning of the time window, as each user is synchronized to the time frame 2360. The stop clock bit 2330, when received marks the end of the reception of the user preamble, which may include identification information. The remaining time 2370, in the time slot 2310, may be utilized for the transmission of additional information, e.g., type of device, biometric data, text data, voice data, etc., to the central office or substation. For example, the biometric data may include information such as heart rate, pulse rate, temperature or with appropriate placement of one or more transmitting devices, an electrocardiogram.

In this illustrated example, the time frame 2350 is selected as two (2) seconds to accommodate up to 2000 users, without CDMA encoding. However, it would be recognized that the time slot and/or time period may be adjusted based on the type and number of expected users with the system. For example, in critical situations, the time period may be adjusted to a smaller value to provide faster updates of the location of a user. As would be recognized, synchronization of the wireless transmission devices with respect to the frame is performed periodically to insure the correct time relationship between the wireless devices and the frame.

While the processing shown in FIG. 20-23 has been explained as being applicable wrist band transmission device, as disclosed in U.S. patent application Ser. No. 12/157,530 (now U.S. Pat. No. 8,238,936), it would be recognized by those skilled in the art that the processing shown is applicable to other types of wireless transmission devices, such a cell telephone, satellite telephone, wireless personal digital assistants and other similar transmission type devices, whether the devices are special purpose (i.e., wrist bands) or general purpose (i.e., cell phones).

In a preferred embodiment, when the Cell Phone Detection, Control, and Position Identification System is utilized in a prison environment the base station may acquire a new cell phone which is turning on within the base station's' antennas range. The Base Station provides, time code, band, type to the cell phone detection sensor array. The cell phone detection sensor array then determines whether the cell phone is within an exclusion zone (exclusions may be pod and/or cell area . . . ). If the cell phone is inside the exclusion zone area, then the Cell Phone Detection, Control, and Position Identification System determines whether the cell phone is an "Authorized Cell Phone" utilizing a database of known authorized cell phone like a home record locator Database interface. If the cell phone is authorized the console displays a location of the cell phone, the (IMEI), and "Authorized cell phone status". However, if the cell phone is not an authorized phone in the database, the base station prevents the incoming and outgoing calls for that cell phone and the console displays the location of the cell phone, the cell phone's IMEI, and "Unauthorized phone status". In a situation in which the base station is just capturing the time code, and IMEI information and does not have the capability of capturing the cell phone, the Phone Detection, Control, and Position Identification System, notifies the local cell provider to deny service (DoS) to that specific cell phone by providing the IMEI information to the telecom company providing the service and displaying the location, IMEI and "Unauthorized phone status" so the correctional staff may pick up the cell phone. However, if the cell phone is outside the control area or area of interest the cell Phone is released to the Network Cell Tower or the calls are allowed and the cell phone is backhauled to the network.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. For example, while the device described herein is referred to as a transmitting device, it would be recognized by those skilled in the art that the device may incorporate a receiving unit, designed to operate in one or more frequency bands over a wide frequency range. For example, the receiving system may represent a crystal receiving system that may detect one or more signals within a frequency range, or may represent a super-hetrodyne receiver that may detect and determine the frequency of operation of received signals.

It is expressly intended that all combinations of those elements that perform substantially the same function in substantially the same way to achieve the same results are within the scope of the invention. Substitutions of elements from one described embodiment to another are also fully intended and contemplated. For example, while the term "cell phone" or "transmission facility" or "transmission device" has been used herein, such terms relate to a general class of wireless transmission devices that includes standard cell phones, smart phones (e.g., PALM CENTRO), and iPhones. PALM is a registered trademark and CENTRO is a trademark of the Palm Inc., Sunnyvale, Calif. iPhone is a registered trademark of Apple Inc. Culpertino, Calif.

While the invention has been described in connection with certain preferred embodiments, other embodiments would be understood by one of ordinary skill in the art and are encompassed herein.

What is claimed is:

1. A method for managing a transmission facility within a set area, said set area being within an area controlled by an external facility, said method comprising:
    detecting a transmission signal associated with said transmission facility by at least one transmission detection facility;
    recording a time of reception of the detected transmission signal at a corresponding one of the at least one transmission detection facility;
    receiving information associated with at least one transmission facility within the set area from the external facility, said information including information regarding an identity of a user associated with each of at least one transmission facility within said set area;
    extracting from said transmission signal identification information associated with said transmission facility;
    identifying a user associated with the transmission facility based on the extracted identification information of the transmission facility and the received information regarding a user associated with each of said at least one transmission facility;
    determining a location of said transmission facility utilizing information associated with selected ones of the at least one transmission detection facility,
    determining an allowability of said transmission facility to receive and transmit based on said determined location and said identification of the identified user;
    providing information regarding said allowability of said transmission facility to at least one action facility; and
    responsive to said allowability information, said at least one action facility operates to control subsequent signal transmissions from said transmission facility.

2. The method of claim 1, wherein said transmission facility transmits said identification information associated with said transmission facility.

3. The method of claim 2, wherein said identification information comprises at least one of: a unique identifier, an IMEI value, a frequency, a type of transmission facility, an encoded IMEI value, an ESN value, a preamble message, a transmission frequency, a transmission identification number, a transmission time of arrival, a transmission type, a transmission characteristics, a transmission location, a transmission amplitude, a transmission width, and a transmission frequency range.

4. The method of claim 1 wherein said at least one action facility comprises at least one of: an education system, and educational information system, an access point, a discriminator unit, a facial identification system, a biometric identification system, a centralized command and control center, a facial recognition unit, a fingerprint device, a retinal eye scan device, a decentralize compartmental command and control center, a cell phone detection, control and position identification system, a cellular network base station, a position identification system, a sub-station, a central unit, a detection unit, a detection facility, a local area network base station, a pseudo-base station, a pseudo-tower, a Global Positioning Satellite (GPS) system, a GPS receiver, a cell tower identifier, a transmission facility identifier, a transmission detection, controlling, identification, and reporting system, a cell-sector detection system, a satellite cell phone system, a CCTV system, a software radio system, a jamming unit, a transmitting unit, a wireless receiving unit, a satellite communication system, a camera system, a recording system, and a graphical display system.

5. The method of claim 1, wherein said location is determined using at least one of: a phase measurement technology, an amplitude measurement technology, a time of arrival measurement technology, a cell-sector determination methodology, a Global Positioning Satellite (GPS), a time different of arrival technology, a signal triangulation technology, an angle of arrival technology, and a location of one of said at least one transmission detection facilities technology.

6. The method of claim 5, wherein amplitude measurement technology comprises:
utilizing at least one largest amplitude value from corresponding ones of said at least one transmission detection facility.

7. The method of claim 1, wherein said allowability is determined based on said identification of said transmission facility matching at least one pre-stored information associated with said transmission facility with respect to said set area.

8. The method of claim 7, wherein said pre-stored information corresponds to at least one unique identification information associated with said transmission facility.

9. The method of claim 1, wherein the transmission facility is at least one of: a communication device, a wristband ID bracelet, a cell phone, a PDA, a Wi-Fi device, a wireless transmission device, and an identification unit.

10. The method of claim 1, further comprising:
providing, to said transmitting facility, at least one of: educational information, medical information, offender management information, facility security information, scheduling information, movement schedule information, and facility asset usage information.

11. The method of claim 1, further comprising:
transmitting at a power so as to be greater than a power of a known existing channel signal within the set area.

12. The method of claim 1, comprising:
receiving said identification information.

13. The method of claim 1, wherein action facility operation comprises at least one of:
tracking movement of the transmission facility, verifying access of the transmission facility to authorized areas, preventing access of the transmission facility to authorized area, integrate the transmission facility with at least one of: a CCTV system, a facial identification system, and a biometric identification system, developing inclusion zones for the transmission facility, and creating exclusion zones for the transmission facility.

14. A system for managing transmissions from a transmission device, said system comprising:
at least one frequency transmission unit;
at least one receiving unit;
a processor in communication with each of said at least one frequency transmission unit and said at least one receiving unit and in communication with a memory, the memory including code which when accessed by the processor configures the processor to:
receive information from at least one of said at least one receiving unit, said information comprising at least detection of a transmission signal from said transmission device;
extract identification information associated with said transmission device from said received information;
receive from an external source, information regarding at least identification of a user associated with each of a plurality of transmission devices within an area managed by said external source;
determine from said extracted identification information and said information received from said external source a user associated with the transmission device;
determine whether said identified user is among at least one user stored in a list of allowable users;
determine a location of said transmission device utilizing information associated with selected ones of the at least one receiving units;
determine an allowability of the transmission device based on the determined location and the identified user; and
provide information regarding said allowability to an action facility, said action facility configured to:
control signal transmission of said transmission device to deny communication to said transmission device when said allowability indicates said transmission device is not allowed to operate.

15. The system of claim 14, wherein said received information from said transmission device provides said at least one unique identification characteristic for positive identification and location of an additional transmission facility.

16. The system of claim 14, wherein the processor is configured to determine said location of said transmission device utilizing at least one of: a phase measurement technology, an amplitude measurement technology, a time of arrival measurement technology, a cell-sector determination methodology, a Global Positioning Satellite (GPS), a time different of arrival technology, a signal triangulation technology, an angle of arrival technology, a location of one of said at least one transmission detection facilities, a map-based location technology and non-iterative location determination technology.

17. The system of claim 16, wherein said non-iterative location determination technology comprises:
obtaining information associated with a plurality of said at least one receiving unit, wherein said plurality of receiving units are arranged such that no three units are installed in a same line and no four units are installed in a same plane, said information being at least a time of reception of the detected signal at a corresponding receiving unit.

18. The system of claim 14, wherein said selected ones of said at least one frequency transmission unit are located at an ingress point of each of a plurality of selected areas within a set area.

19. The system of claim 18, wherein allowability in each of said plurality of selected areas is determined based on said list of allowable identification characteristics corresponding to each of said selected areas.

20. The system of claim 14, wherein said at least one of said at least one frequency transmission unit selectively outputs a signal within a frequency band about a frequency of transmission of said transmission device.

21. The system of claim 14, wherein said unique identification characteristic comprises at least one of: a unique identifier, an IMEI value, a frequency, a type of transmission facility, an encoded IMEI value, an ESN value, a preamble message, a transmission frequency, a transmission identification number, a transmission time of arrival, a transmission type, a transmission characteristics, a transmission location, a transmission amplitude, a transmission width, and a transmission frequency range.

22. A method of managing a transmission device within a set area, wherein said set area is within an area controlled by an external source said method comprising:
   detecting a transmission associated with said transmission device by at least one transmission detection facility;
   extracting identification information associated with said transmission device from said received transmission;
   determining a location of said transmission device based on said detection of the transmission by selected ones of the at least one transmission detection facility;
   receiving information regarding a user associated with each of a plurality of transmission devices within said area from said external source;
   identifying a user based on the identification information associated with said transmission device and the received information regarding a user associated with each of a plurality of transmission devices;
   determining an allowability of the transmission device based on the identified user associated with the transmission device; and
   communicating said determined allowability of said transmission device to an action facility, wherein said information causes said action facility to perform at least one of: an interaction with and a manipulation of signal transmissions of said transmission device.

23. The method of claim 22, wherein said manipulation occurs when allowability is not indicated.

24. The method of claim 23, wherein said manipulation comprises:
   transmitting a signal within a frequency band about a frequency of said transmission device.

25. The method of claim 22, wherein said location is determined based on a location of at least one of said transmission detection facility.

26. The method of claim 22, further comprising:
   displaying each detection of said transmission device, said display including at least one unique characteristic of said transmission device.

27. The method of claim 22, wherein said interaction comprises:
   transmitting said detected transmission to a second device.

28. The method of claim 22, wherein the allowability is adapted based on a list of unique characteristics associated with each of a plurality of transmission devices.

29. The method of claim 28, wherein the allowability in each of a plurality of areas within said set area is based on a list of unique characteristics corresponding to each of said plurality of areas.

* * * * *